(12) United States Patent
Asano

(10) Patent No.: US 7,515,299 B2
(45) Date of Patent: Apr. 7, 2009

(54) IMAGE PROCESSOR, IMAGE OUTPUT DEVICE, IMAGE INPUT DEVICE, AND MULTIFUNCTION DEVICE

(75) Inventor: Motohiro Asano, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 678 days.

(21) Appl. No.: 10/870,998

(22) Filed: Jun. 21, 2004

(65) Prior Publication Data

US 2005/0195453 A1 Sep. 8, 2005

(30) Foreign Application Priority Data

Mar. 5, 2004 (JP) ............................. 2004-063247

(51) Int. Cl.
G03F 3/08 (2006.01)
H04N 1/46 (2006.01)
G06F 3/12 (2006.01)
G06K 9/00 (2006.01)

(52) U.S. Cl. .................. 358/1.9; 358/518; 358/523; 358/504; 358/524; 358/1.1; 382/162; 382/167

(58) Field of Classification Search .............. 358/1.1, 358/1.14, 1.9, 487–488, 518, 520, 504, 523, 358/524; 382/162, 164, 167, 173, 175–176, 382/180, 190, 274; 399/82, 87–88; 347/19; 348/223.1
See application file for complete search history.

(56) References Cited

U.S. PATENT DOCUMENTS 6,215,563 B1 * 4/2001 Onishi et al. ................ 358/487

| | | | | |
|---|---|---|---|---|
| 6,761,426 B2 * | 7/2004 | Tsuchiya et al. | | 347/19 |
| 6,876,825 B2 * | 4/2005 | Kurahashi et al. | | 399/82 |
| 7,092,654 B2 * | 8/2006 | Kurahashi et al. | | 399/82 |
| 7,142,711 B2 * | 11/2006 | Goto et al. | | 382/167 |
| 7,369,271 B2 * | 5/2008 | Itagaki | | 358/1.9 |
| 2001/0043376 A1 * | 11/2001 | Kumada et al. | | 358/504 |
| 2003/0133607 A1 | 7/2003 | Goto et al. | | |
| 2004/0046972 A1 * | 3/2004 | Shibao | | 358/1.1 |

FOREIGN PATENT DOCUMENTS

| | | |
|---|---|---|
| JP | 1-167791 | 3/1989 |
| JP | 2001-16450 | 1/2001 |
| JP | 2001-78047 | 3/2001 |
| JP | 2002-94823 | 3/2002 |
| JP | 2002-254710 | 9/2002 |
| JP | 2003-209708 | 7/2003 |
| JP | 2004-7052 | 1/2004 |

OTHER PUBLICATIONS

Communication from Japanese Patent Office.

* cited by examiner

*Primary Examiner*—Edward L Coles
*Assistant Examiner*—Charlotte M Baker
(74) *Attorney, Agent, or Firm*—Buchanan Ingersoll & Rooney PC

(57) ABSTRACT

A multifunction device includes a look-up table generation portion for generating a look-up table in accordance with a profile of a print mechanism or an image read mechanism and a profile of an apparatus except for the multifunction device, a look-up table memory for storing the generated look-up table, and a color conversion portion for performing a process of color conversion for image data obtained by an input and output interface or the image read mechanism in accordance with the look-up table stored in the look-up table memory.

4 Claims, 29 Drawing Sheets

FIG.9
(a) C4a
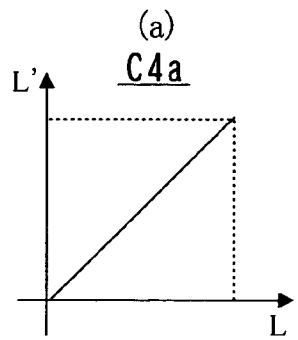
| L | L' |
|---|---|
| 0 | 0 |
| 1 | 1 |
| ⋮ | ⋮ |
| 100 | 100 |
(b) C4b
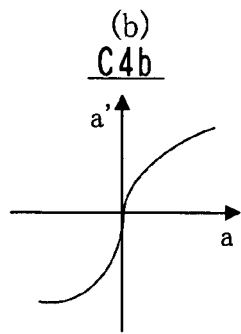
| a | a' |
|---|---|
| -128 | -128 |
| -112 | -100 |
| ⋮ | ⋮ |
| 0 | 0 |
| ⋮ | ⋮ |
| 127 | 127 |
(c) C4c
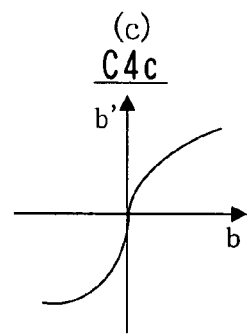
| b | b' |
|---|---|
| -128 | -128 |
| -112 | -100 |
| ⋮ | ⋮ |
| 0 | 0 |
| ⋮ | ⋮ |
| 127 | 127 |
(d) C4d
| No. | L' | a' | b' | C | M | Y | K |
|---|---|---|---|---|---|---|---|
| 1 | 0 | -128 | -128 | 225 | 166 | 51 | 142 |
| 2 | 0 | -128 | -112 | 225 | 166 | 51 | 155 |
| 3 | 0 | -128 | -96 | 225 | 128 | 51 | 185 |
| ⋮ | ⋮ | ⋮ | ⋮ | ⋮ | ⋮ | ⋮ | ⋮ |
| 4912 | 100 | 128 | 112 | 0 | 177 | 215 | 0 |
| 4913 | 100 | 128 | 128 | 0 | 169 | 255 | 0 |
(e) C4e
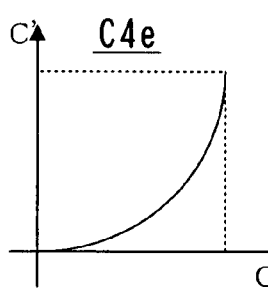
| C | C' |
|---|---|
| 0 | 0 |
| 1 | 0.5 |
| ⋮ | ⋮ |
| 255 | 255 |
(f) C4f
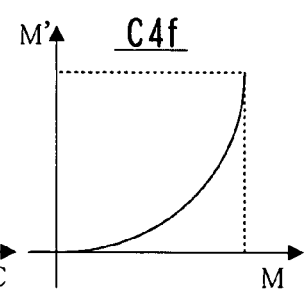
| M | M' |
|---|---|
| 0 | 0 |
| 1 | 0.8 |
| ⋮ | ⋮ |
| 255 | 255 |
(g) C4g
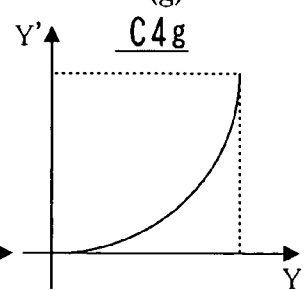
| Y | Y' |
|---|---|
| 0 | 0 |
| 1 | 0.4 |
| ⋮ | ⋮ |
| 255 | 255 |
(h) C4h
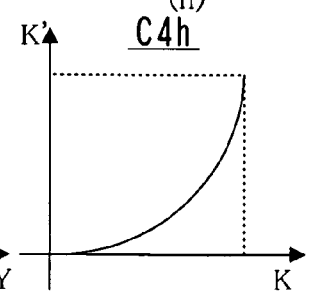
| K | K' |
|---|---|
| 0 | 0 |
| 1 | 0.7 |
| ⋮ | ⋮ |
| 255 | 255 |

|  | ACTUAL DATA | 8bit |
|---|---|---|
| L | 0-100 | 0-255(0xff) |
| a,b | -128 TO 127 | 0-255 |

(b)

|  | ACTUAL DATA | 16bit |
|---|---|---|
| L | 0-100 | 0-65280(0xff00) |
| a,b | -128 TO 127 | 0-65280 |

(c)

|  | ACTUAL DATA | 8bit | 16bit |
|---|---|---|---|
| L | 0-100 | 0-255(0xff) | 0-65280(0xff00) |
| a,b | -128 TO 127 | 0-255 | 0-65280 |

| No. | R | G | B | C | M | Y | K |
|---|---|---|---|---|---|---|---|
| 1 | 0 | 0 | 0 | 15 | 18 | 10 | 255 |
| 2 | 0 | 0 | 15.9 | 23 | 25 | 7 | 250 |
| 3 | 0 | 0 | 31.9 | 35 | 37 | 6 | 244 |
| ⋮ | ⋮ | ⋮ | ⋮ | ⋮ | ⋮ | ⋮ | ⋮ |
| 4912 | 255 | 255 | 239 | 0 | 0 | 6 | 0 |
| 4913 | 255 | 255 | 255 | 0 | 0 | 0 | 0 |

FIG.13
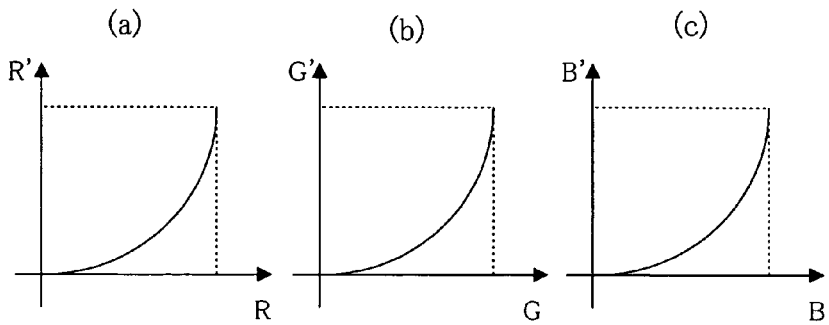
(d)
| No. | R' | G' | B' | C | M | Y | K |
|---|---|---|---|---|---|---|---|
| 1 | 0 | 0 | 0 | 15 | 18 | 10 | 255 |
| 2 | 0 | 0 | 15.9 | 23 | 25 | 7 | 250 |
| 3 | 0 | 0 | 31.9 | 35 | 37 | 6 | 244 |
| ⋮ | ⋮ | ⋮ | ⋮ | ⋮ | ⋮ | ⋮ | ⋮ |
| 4912 | 255 | 255 | 239 | 0 | 0 | 6 | 0 |
| 4913 | 255 | 255 | 255 | 0 | 0 | 0 | 0 |
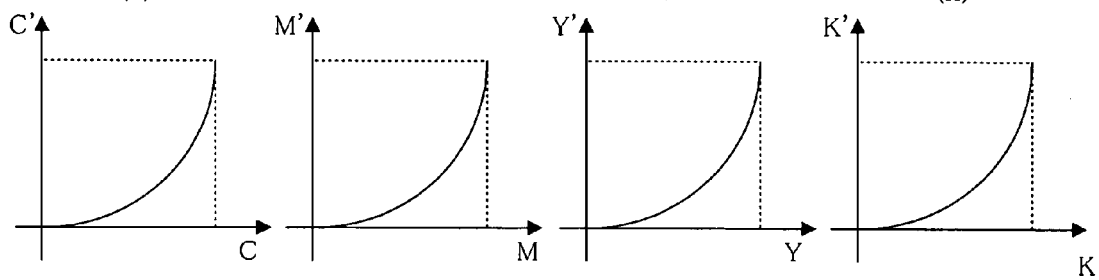

| No. | L' | a' | b' | C | M | Y | K |
|---|---|---|---|---|---|---|---|
| 1 | 0 | -128 | -128 | 255 | 166 | 51 | 142 |
| 2 | 0 | -128 | -120 | 255 | 166 | 51 | 146 |
| 3 | 0 | -128 | -112 | 255 | 156 | 51 | 153 |
| ⋮ | ⋮ | ⋮ | ⋮ | ⋮ | ⋮ | ⋮ | ⋮ |
| 35936 | 100 | 127 | 120 | 0 | 170 | 233 | 0 |
| 35937 | 100 | 127 | 127 | 0 | 169 | 255 | 0 |

FIG.16
(a) C4a″
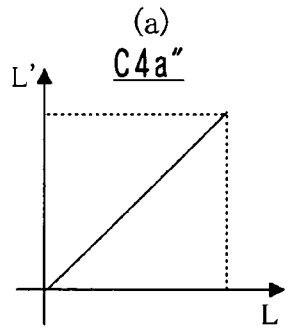
| L | L' |
|---|---|
| 0 | 0 |
| 1 | 1 |
| ⋮ | ⋮ |
| 100 | 100 |
(b) C4b″
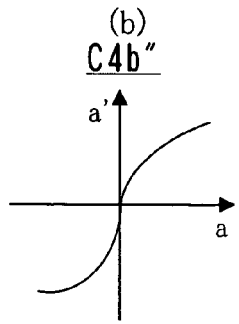
| a | a' |
|---|---|
| -128 | -128 |
| -112 | -100 |
| ⋮ | ⋮ |
| 0 | 0 |
| ⋮ | ⋮ |
| 127 | 127 |
(c) C4c″
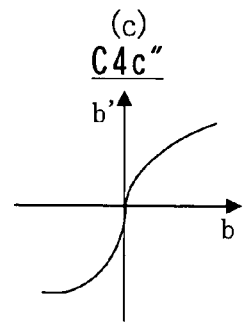
| b | b' |
|---|---|
| -128 | -128 |
| -112 | -100 |
| ⋮ | ⋮ |
| 0 | 0 |
| ⋮ | ⋮ |
| 127 | 127 |
(d) C4d″
| No. | L' | a' | b' | C | M | Y | K |
|---|---|---|---|---|---|---|---|
| 1 | 0 | -128 | -128 | 65535 | 42598 | 13107 | 36505 |
| 2 | 0 | -128 | -112 | 65535 | 42598 | 13107 | 39935 |
| 3 | 0 | -128 | -96 | 65535 | 32768 | 13107 | 47615 |
| ⋮ | ⋮ | ⋮ | ⋮ | ⋮ | ⋮ | ⋮ | ⋮ |
| 4912 | 100 | 128 | 112 | 0 | 45383 | 55295 | 0 |
| 4913 | 100 | 128 | 128 | 0 | 43335 | 65535 | 0 |
(e) C4e″
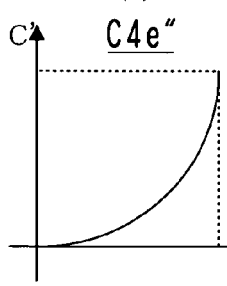
| C | C' |
|---|---|
| 0 | 0 |
| 257 | 130 |
| ⋮ | ⋮ |
| 65535 | 65535 |
(f) C4f″
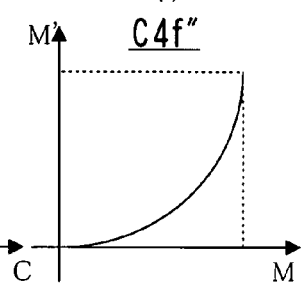
| M | M' |
|---|---|
| 0 | 0 |
| 257 | 240 |
| ⋮ | ⋮ |
| 65535 | 65535 |
(g) C4g″
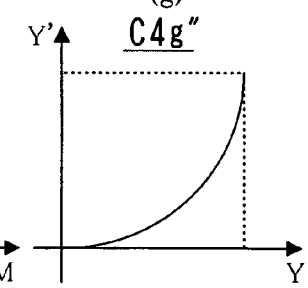
| Y | Y' |
|---|---|
| 0 | 0 |
| 257 | 118 |
| ⋮ | ⋮ |
| 65535 | 65535 |
(h) C4h″
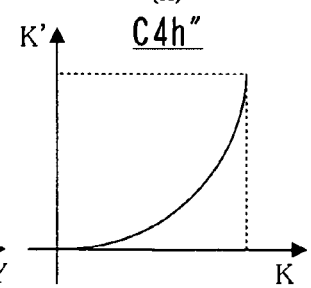
| K | K' |
|---|---|
| 0 | 0 |
| 257 | 189 |
| ⋮ | ⋮ |
| 65535 | 65535 |

| R2 | G2 | B2 | L | a | b |
|---|---|---|---|---|---|
| 0 | 0 | 0 | 0.09 | −0.04 | −0.3 |
| 1 | 0 | 0 | 1.9 | 6.2 | 2.4 |
| 2 | 0 | 0 | 3.8 | 12.4 | 4.9 |
| ⋮ | ⋮ | ⋮ | ⋮ | ⋮ | ⋮ |

| No. | R | G | B | R' | G' | B' | Blank |
|---|---|---|---|---|---|---|---|
| 1 | 0 | 0 | 0 | 0 | 0 | 0 | 0 |
| 2 | 0 | 0 | 15.9 | 5 | 3 | 12 | 0 |
| 3 | 0 | 0 | 31.9 | 7 | 5 | 25 | 0 |
| ⋮ | ⋮ | ⋮ | ⋮ | ⋮ | ⋮ | ⋮ | ⋮ |
| 4912 | 255 | 255 | 239 | 253 | 249 | 224 | 0 |
| 4913 | 255 | 255 | 255 | 255 | 255 | 255 | 0 |

| No. | C | M | Y | K | L | a | b |
|---|---|---|---|---|---|---|---|
| 1 | 0 | 0 | 0 | 0 | 100 | 0 | 0 |
| 2 | 0 | 0 | 0 | 31.9 | 89.6 | 0.1 | 0.4 |
| 3 | 0 | 0 | 0 | 63.8 | 79.1 | 0.2 | 0.9 |
| ⋮ | ⋮ | ⋮ | ⋮ | ⋮ | ⋮ | ⋮ | ⋮ |
| 6560 | 255 | 255 | 255 | 223.1 | 26.1 | −0.6 | 4.6 |
| 6561 | 255 | 255 | 255 | 255 | 21.6 | −0.2 | 2.1 |

IMAGE PROCESSOR, IMAGE OUTPUT DEVICE, IMAGE INPUT DEVICE, AND MULTIFUNCTION DEVICE

This application is based on Japanese Patent Application No. 2004-063247 filed on Mar. 5, 2004, the contents of which are hereby incorporated by reference.

BACKGROUND OF THE INVENTION

1. Field of the Invention

The present invention relates to an image processor or the like for outputting a color image obtained by a scanner to a monitor or a printing apparatus, or outputting a color image displayed on a monitor to a printing apparatus appropriately.

2. Description of the Prior Art

When a color image is outputted from a monitor and a printing apparatus in accordance with the same image data, it is difficult to get complete color matching between the color on the display screen and the color on the printed matter. In addition, it is also difficult to reproduce the completely same color as an original when obtaining an original color image by a scanner and outputting it from a monitor or a printing apparatus. Therefore, in order to reproduce a color that is as similar as possible, a color matching technique is proposed.

A standard of the color matching is defined by International Color Consortium (ICC) so as to promote standardization of the same. Thus, it has been inevitable for manufacturers to adapt apparatuses handling color data to the ICC standard. In general, color characteristic data of an apparatus that supports the ICC standard is called an "ICC profile". The ICC profile is represented by a look-up table (LUT) or table data for a matrix conversion, and this format is based on the ICC standard.

A designer of an apparatus can design the ICC profile freely within the ICC standard. The ICC standard has a flexibility and a high degree of freedom, so a designer can determine a lattice point pitch of LUT and a data bit length of each value rather freely, for example. Conventionally, in order to maintain the high flexibility of the ICC standard in a process of a color conversion, the color conversion process is performed by a software process as described in Japanese unexamined patent publication No. 2002-94823.

Recently, a print engine that is adopted for a printing apparatus, a copying machine and a multifunction peripheral (MFP) has become faster and faster.

However, the color conversion process (color matching) performed by a software process as the conventional method requires a lot of time, so the performance thanks to the high speed of the print engine cannot be used sufficiently.

In addition, a multifunction device having functions of color print, color copy, color scanner and others has become a main stream recently. Such a multifunction device has to perform various types of color matching process for each of the functions.

SUMMARY OF THE INVENTION

An object of the present invention is to achieve a color conversion process faster than the conventional method. Another object of the present invention is to achieve a high speed color conversion process also in a multifunction device having functions of color print, color scanner and others.

An image processor according to the present invention, which performs a color conversion process on image data of a color image, includes a data obtaining portion for obtaining the image data, a look-up table generation portion for generating a look-up table in accordance with a profile of the image processor and a profile of another apparatus, a storage device for storing the generated look-up table, and a color conversion circuit for performing the color conversion process on the obtained image data in accordance with the look-up table stored in the storage device.

An output portion is provided for outputting a color image in accordance with image data on which the color conversion circuit performed the color conversion process.

For example, if the image processor has a printing apparatus for printing a color image as the output portion, the following structure is adopted. The data obtaining portion obtains image data of a color image to be printed from a computer to which a monitor is connected. The look-up table generation portion generates a look-up table for linking values that indicate display colors of the monitor to values that indicate print colors of the printing apparatus corresponding to the display colors in accordance with a profile of the printing apparatus and a profile of the monitor. The printing apparatus prints a color image in accordance with the image data on which the color conversion circuit performed the conversion process.

If the image processor has the output portion that is a printing apparatus for performing simulation (proof print) of another printing apparatus that prints a color image displayed on the monitor, the following structure is adopted. The data obtaining portion obtains image data of a color image to be printed by another printing apparatus from a computer to which a monitor is connected. The look-up table generation portion generates a look-up table for linking values that indicate display colors of the monitor to values that indicate print colors of the printing apparatus corresponding to the print colors in accordance with a profile of the printing apparatus, a profile of the monitor and a profile of the other printing apparatus. The printing apparatus prints a color image by simulating the other printing apparatus in accordance with the image data on which the color conversion circuit performed the color conversion process.

If the image processor has a communication device for performing communication with a computer including a monitor as the output portion and has an image read device for generating image data of a color image by reading an original of the color image, the following structure is adopted. The look-up table generation portion generates a look-up table for linking values that indicate read colors of the image read device to values that indicate display colors of the monitor corresponding to the read colors in accordance with a profile of the image read device and a profile of the monitor. The communication portion transmits the image data on which the color conversion circuit performed the conversion process to the computer.

A multifunction device according to the present invention includes an image read device for obtaining image data of a color image by reading an original of the color image, a printing apparatus for printing the color image on a sheet of paper, a communication device for transmitting image data to or receiving image data from a computer having a monitor, a process mode selection portion for selecting one of a print mode, a copy mode, a scan mode and a simulation mode, a look-up table generation portion for generating a look-up table, a storage device for storing the generated look-up table, and a color conversion circuit for performing a color conversion process on the image data in accordance with the look-up table stored in the storage device.

If the print mode is selected, the look-up table generation portion generates a look-up table for linking values that indicate display colors of the monitor to values that indicate print colors of the printing apparatus corresponding to the display colors in accordance with a profile of the printing apparatus and a profile of the monitor, the color conversion circuit performs the color conversion process on the image data received from the computer, and the printing apparatus prints a color image in accordance with the image data on which the color conversion circuit performed the conversion process.

If the copy mode is selected, the look-up table generation portion generates a look-up table for linking values that indicate read colors of the image read device to values that indicate print colors of the printing apparatus corresponding to the read colors in accordance with a device link profile of the multifunction device, the color conversion circuit performs the color conversion process on the image data obtained by the image read device, and the printing apparatus prints a color image in accordance with the image data on which the color conversion circuit performed the color conversion process.

If the scan mode is selected, the look-up table generation portion generates a look-up table for linking values that indicate read colors of the image read device to values that indicate display colors of the monitor corresponding to the read colors in accordance with a profile of the image read device and a profile of the monitor, the color conversion circuit performs the color conversion process on the image data obtained by the image read device, and the communication portion transmits the image data on which the color conversion circuit performed the conversion process to the computer.

If the simulation mode is selected, the look-up table generation portion generates a look-up table for linking values that indicate display colors of the monitor to values that indicate print colors of the printing apparatus corresponding to the print colors in accordance with a profile of the printing apparatus, a profile of the monitor and a profile of another printing apparatus, the color conversion circuit performs the color conversion process on the image data received from the computer, and the printing apparatus prints a color image by simulating the print result of the display colors of the monitor using the other printing apparatus in accordance with the image data on which the color conversion circuit performed the color conversion process.

The multifunction device is used as a printer for a personal computer or the like when it is in the print mode, is used as a scanner for converting an original image into electronic data when it is in the scan mode, is used as a copying machine for obtaining a copy of an original when it is in the copy mode, and is used as a proofing machine for another printing apparatus when it is in the simulation mode. In addition, the multifunction device is used as an image processor for performing a color conversion in accordance with an LUT in any process mode.

According to the present invention, a color conversion process can be performed at higher speed than the conventional method. Furthermore, predetermined format of LUT can be generated from various types of input profiles, so a common hardware for a color conversion process can be used even in a multiple function apparatus that needs various color conversions.

BRIEF DESCRIPTION OF THE DRAWINGS

FIG. 9 is a diagram showing an example of the conversion data included in a printer profile.

FIG. 11 is a diagram showing an example of an encode corresponding to an ICC profile.

FIG. 12 is a diagram showing an example of a look-up table for a color conversion.

FIG. 13 is a diagram showing a variation of the look-up table for a color conversion.

FIG. 14 is a diagram showing a variation of the conversion data included in the printer profile.

FIG. 16 is a diagram showing a variation of the conversion data included in the printer profile.

FIG. 19 is a diagram showing an example of the conversion data included in a scanner profile.

FIG. 21 is a diagram showing an example of the look-up table for a color conversion process.

FIG. 22 is a diagram showing an example of the conversion data included in a simulation profile.

DESCRIPTION OF THE PREFERRED EMBODIMENTS

Hereinafter, the present invention will be explained more in detail with reference to embodiments and drawings.

Figure 1:
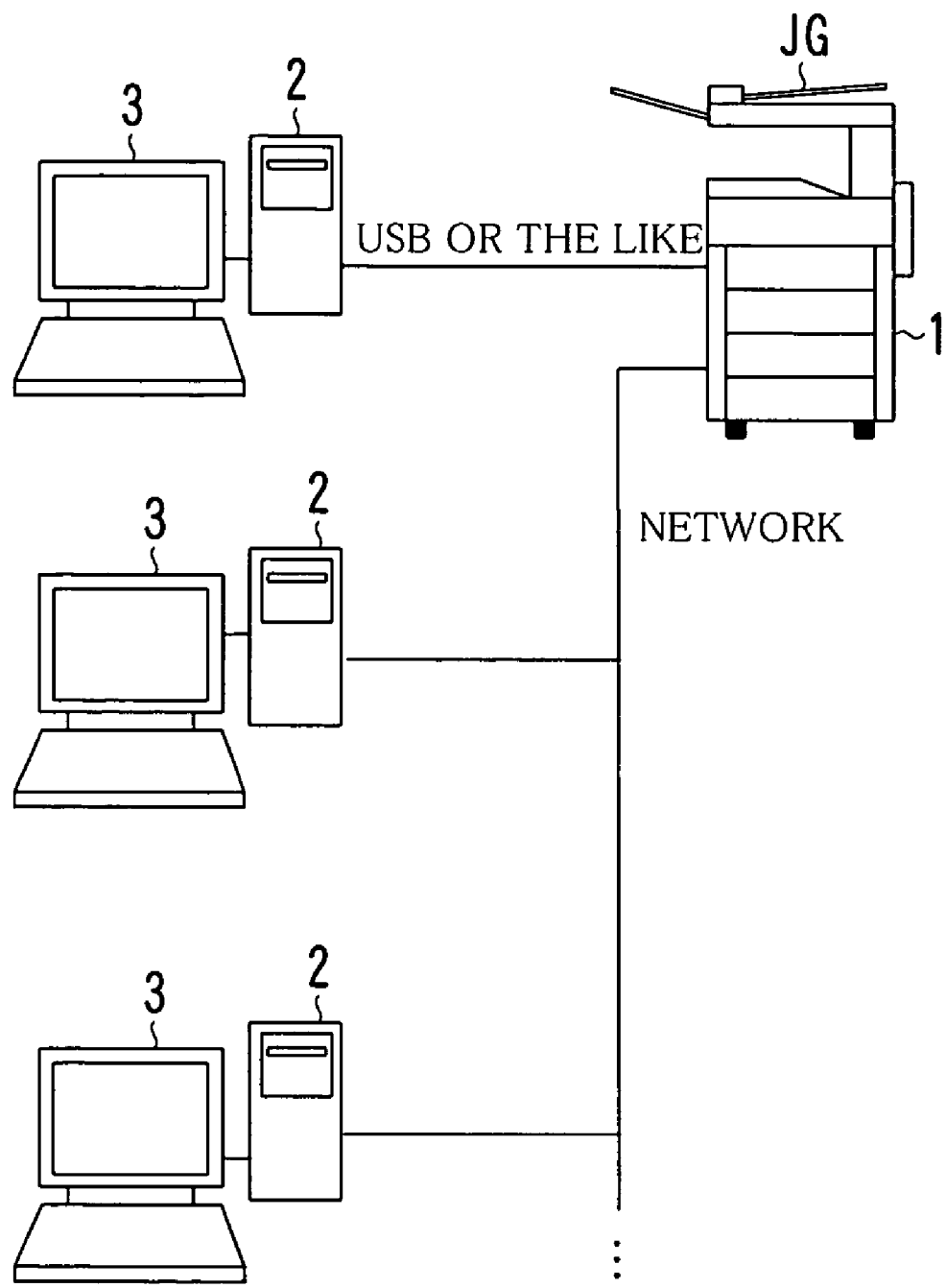
FIG. 1 is a diagram showing a general structure of an image processing system.
Figure 2:
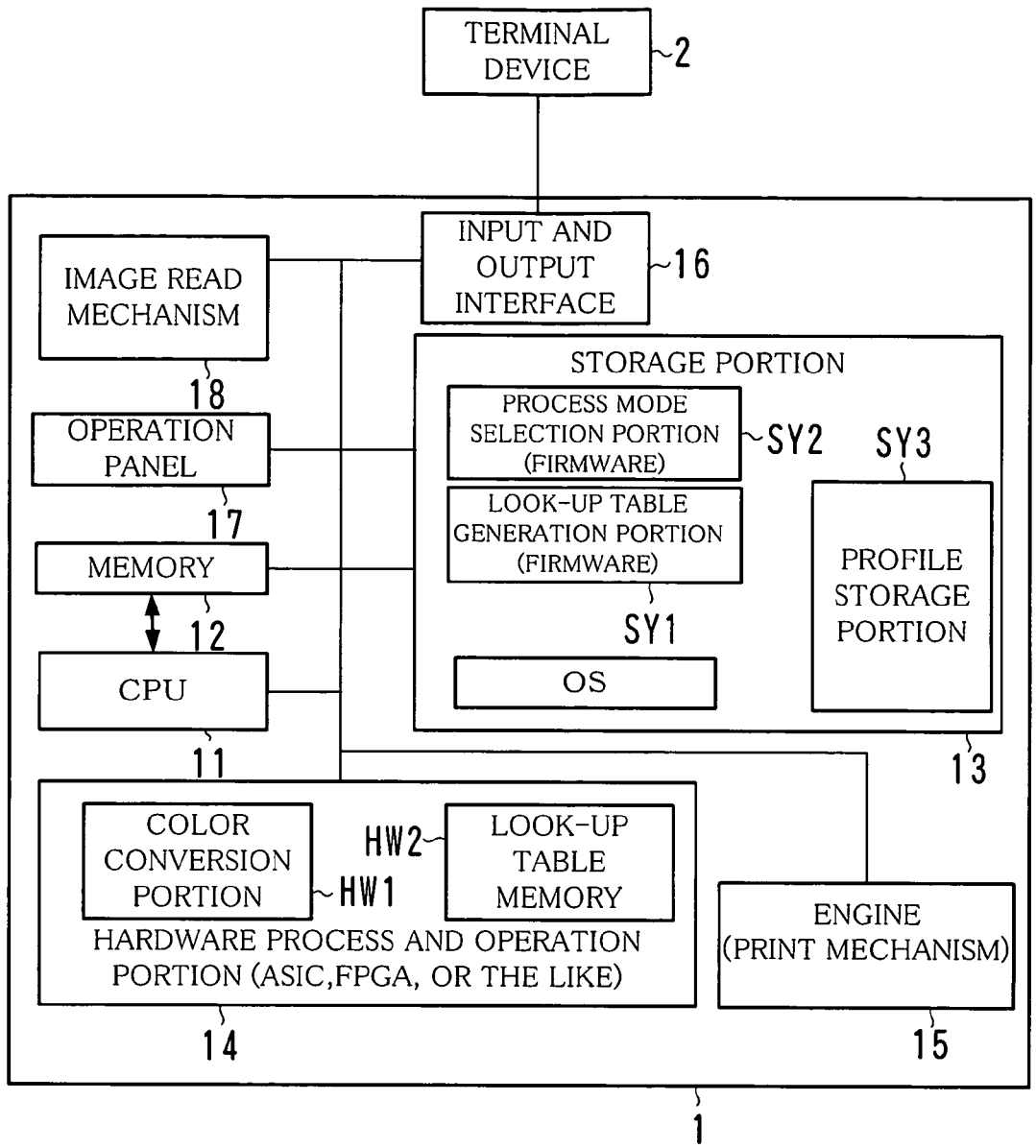
FIG. 2 is a diagram showing an example of a structure of a multifunction device.
Figure 3:
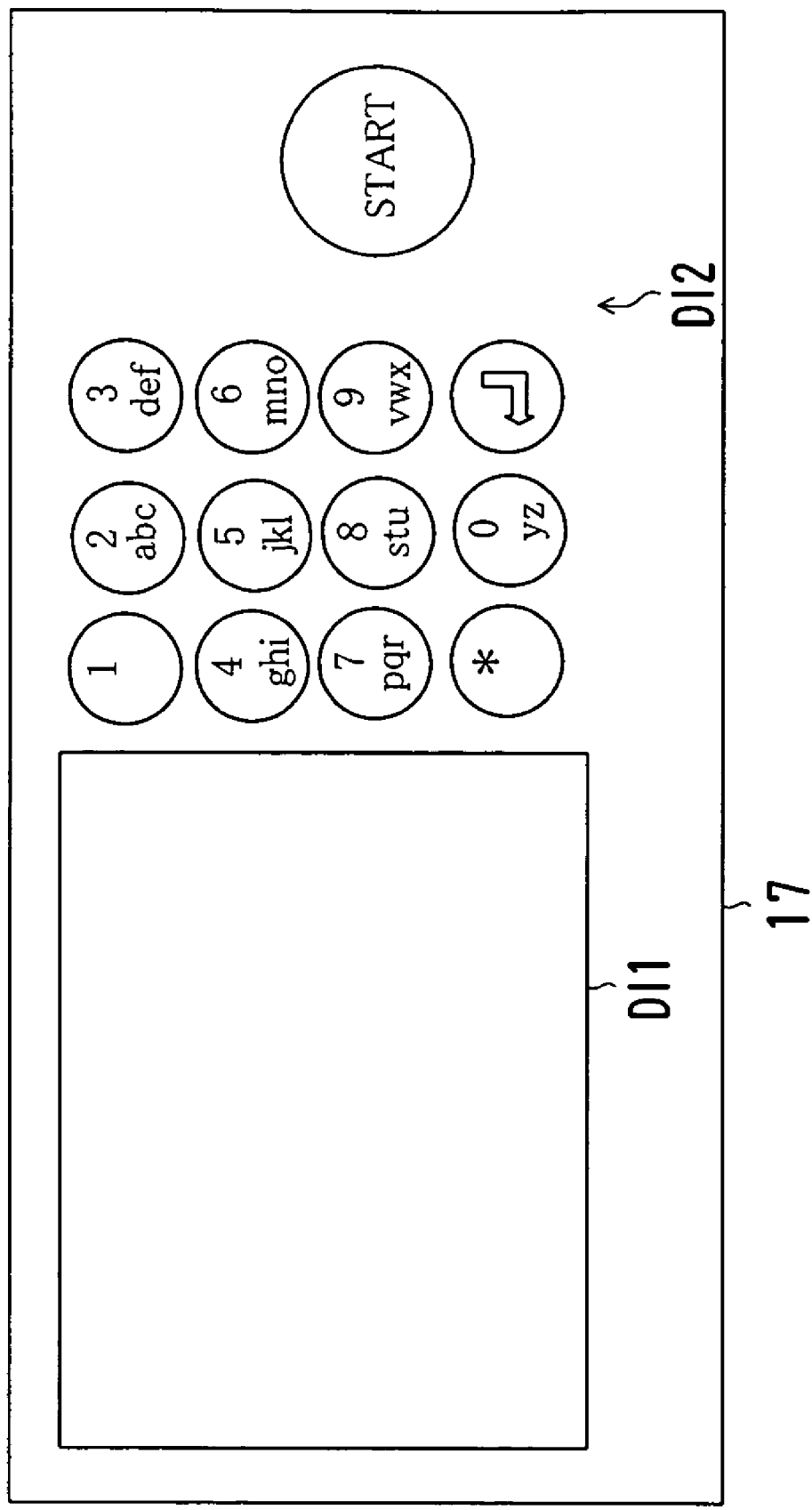
FIG. 3 is a diagram showing an example of a view of an operation panel.
Figure 4:
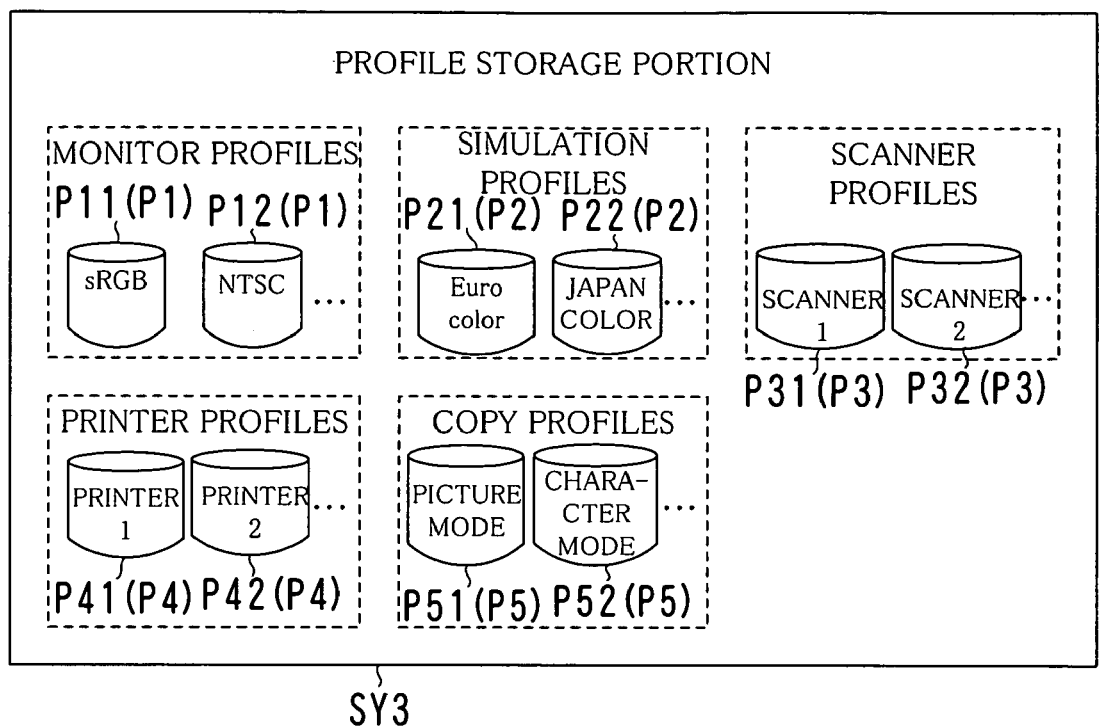
FIG. 4 is a diagram showing an example of a profile that is stored in a profile storage portion.
Figure 5:
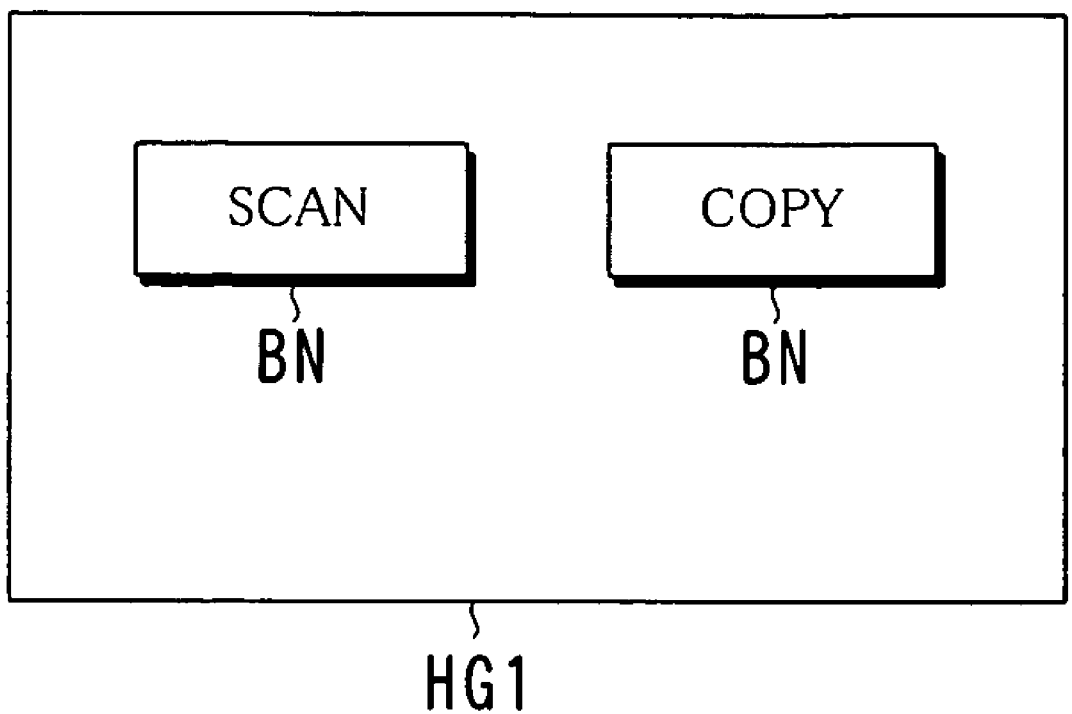
FIG. 5 is a diagram showing an example of a process mode selection screen.

FIG. 1 is a diagram showing a general structure of an image processing system 100, FIG. 2 is a diagram showing an example of a structure of a multifunction device 1, FIG. 3 is a diagram showing an example of a view of an operation panel 17, FIG. 4 is a diagram showing an example of a profile that is stored in a profile storage portion SY3, and FIG. 5 is a diagram showing an example of a process mode selection screen HG1.

The image processing system 100 includes the multifunction device 1 according to the present invention, terminal devices 2 and others as shown in FIG. 1. The multifunction device 1 is an apparatus having integrated functions of a copy machine, a printer, a scanner, a FAX machine, a document server and others, which is also called an MFP (Multi Function Peripheral). This multifunction device 1 is connected to the terminal devices 2 via a network or an interface such as USB (Universal Serial Bus). The terminal device 2 is connected to a monitor (a display) 3. As the terminal device 2, a personal computer or a workstation can be used.

A user can use the multifunction device 1 for various purposes. For example, a document generated by application software such as word processing software, spreadsheet software, drawing software, or CG software that is installed in the terminal device 2 can be printed out by the multifunction device 1. Hereinafter, a process or a usage for printing electronic data in the terminal device 2 from the multifunction device 1 as described above may be referred to as a "print mode".

Prior to printing out a generated document by a large printing apparatus in a large quantity, it can be printed out by the multifunction device 1 as a test print (a simulation or a proof print). Hereinafter, such a process or a usage may be called a "simulation mode".

A paper original can be scanned by the multifunction device 1 so that an image in the original can be converted into electronic data, which can be processed or stored electrically by the terminal device 2. Hereinafter, such a process or a usage may be called a "scan mode". Furthermore, the multifunction device 1 can copy a paper original. Hereinafter, such a process or a usage may be called a "copy mode".

The multifunction device 1 includes a CPU 11, a memory 12 such as a RAM, a storage portion 13 such as a hard disk drive or a flash memory, a hardware process and operation portion 14 including a circuit such as an ASIC or a FPGA, a print mechanism 15, an input and output interface 16, an operation panel 17 and an image read mechanism 18 as shown in FIG. 2.

The storage portion 13 stores MFP firmware and programs such as an operating system (OS) for realizing a look-up table generation portion SY1, a process mode selection portion SY2 and others, which are described later. In addition, the storage portion 13 includes a profile storage portion SY3 as a storage area for storing a profile of the multifunction device 1 and profiles of other devices.

These programs and profiles are loaded into the memory 12 as necessary, and the programs are executed by the CPU 11. In other words, the look-up table generation portion SY1 and the process mode selection portion SY2 are realized when the CPU 11 controls hardware by the software process.

The hardware process and operation portion 14 includes a color conversion portion HW1 and a look-up table memory HW2. The color conversion portion HW1 is a hardware for performing a color conversion process (color matching) that will be described later. The look-up table memory HW2 is a memory for storing a look-up table (LUT) that is used for the color conversion process. The memory 12 or the storage portion 13 can be used as the look-up table memory HW2. In addition, the hardware process and operation portion 14 includes a hardware for controlling the print mechanism 15, the input and output interface 16, the operation panel 17, the image read mechanism 18 and others.

The print mechanism 15 is a device (engine) for printing a color image to be printed on a sheet of paper as an output. The input and output interface 16 is a device for communication with an external device such as a terminal device 2. As the input and output interface 16, USB (Universal Serial Bus), RS-232C, a modem or an NIC (Network Interface Card) can be used.

The operation panel 17 is a user interface for a user of the multifunction device 1 and includes a touch panel DI1, an operation button DI2 and others as shown in FIG. 3. A liquid crystal display is used for displaying a operation screen or a setting screen.

The image read mechanism 18 includes an original table, an image sensor such as a CCD, an automatic document feeding device JG (see FIG. 1). It reads optically a monochrome image or a color image on the original and converts the image into electronic data so as to generate image data. In other words, it is a scanner device.

The profile storage portion SY3 shown in FIG. 2 stores one or more profiles including monitor profile P1 (P11, P12, . . . ), simulation profile P2 (P21, P22, . . . ), scanner profile P3 (P31, P32, . . . ), printer profile P4 (P41, P42, . . . ), copy profile P5 (P51, P52, . . . ) and others as shown in FIG. 4. Namely, it is a database of profiles.

These profiles are obtained from the terminal device 2 as necessary in the process of the print mode, the simulation mode or the scan mode. Profiles that are usually used for structuring a product or major profiles are stored in advance when the multifunction device 1 is shipped from the factory. In addition, the multifunction device 1 is capable of adding a new profile by a user's operation. Thus, when firmware is updated for example, a profile can be added to the multifunction device 1 by installing from a recording medium such as a CD-ROM or by downloading from a Web site of a manufacture of each device via a network.

Adding to the above-mentioned application software, a printer driver of the print mechanism 15 of the multifunction device 1, a scanner driver of the image read mechanism 18 (for example, a TWAIN driver) and a display driver of the monitor 3 that is connected to the terminal device 2 are installed into the terminal device 2.

Hereinafter, contents of processes of the multifunction device 1 and the terminal device 2 in each process mode of the print mode, the scan mode, the simulation mode and the copy mode will be described in detail.

The operation panel 17 displays a process mode selection screen HG1 on the touch panel DI1 (see FIG. 3) as shown in FIG. 5. When one of the buttons BN is pressed, a process mode signal 81 indicating the button BN is transmitted to the process mode selection portion SY2. The terminal device 2 transmits a command 82 entered by the user to the multifunction device 1.

The process mode selection portion SY2 selects a process mode in accordance with the process mode signal 81 received from the operation panel 17 or the command 82 received from the terminal device 2.

[Print Mode]

Figure 6:
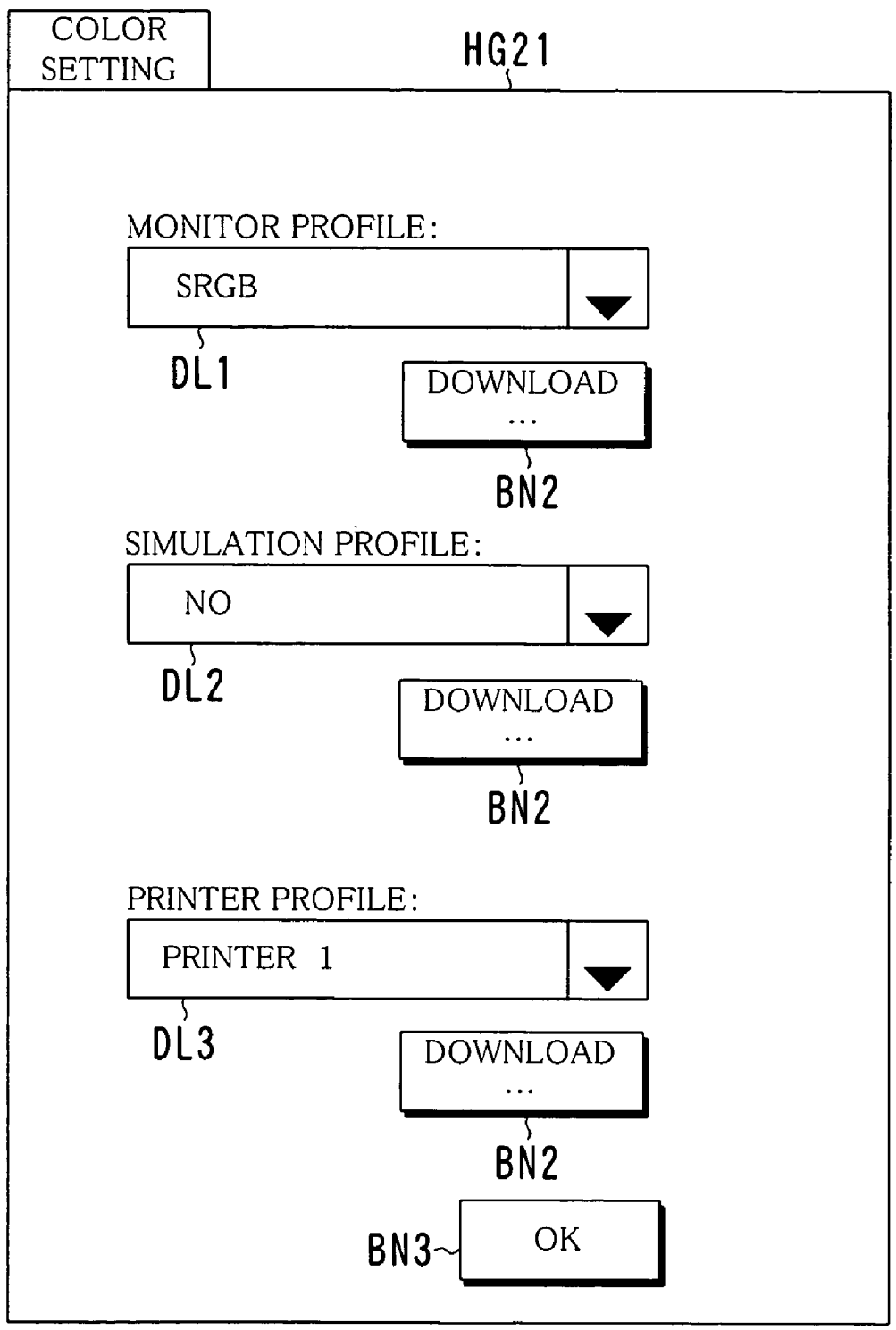
FIG. 6 is a diagram showing an example of a printer driver setting screen.
Figure 7:
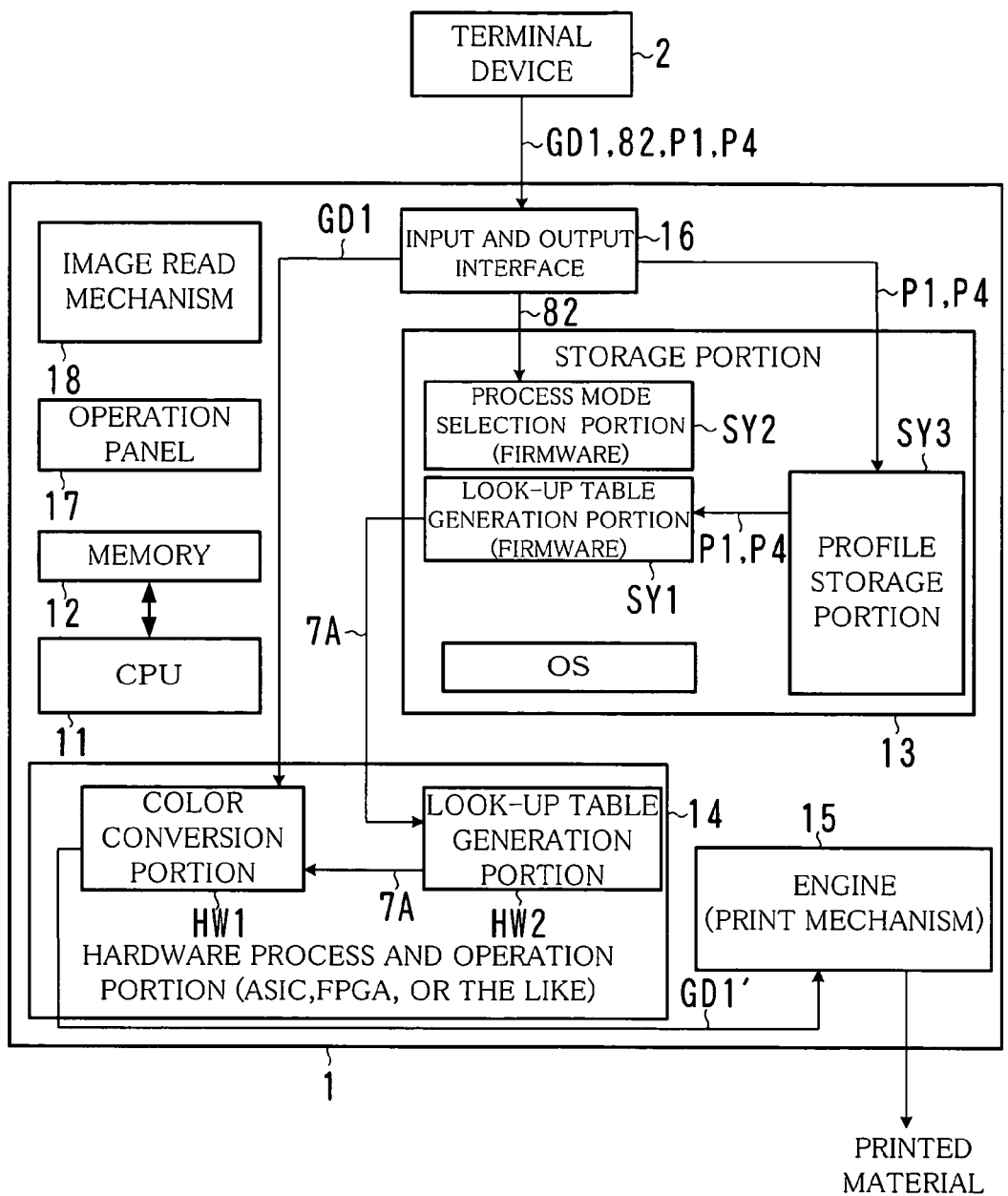
FIG. 7 is a diagram showing an example of a data flow of the multifunction device and others in a print mode.
Figure 8:
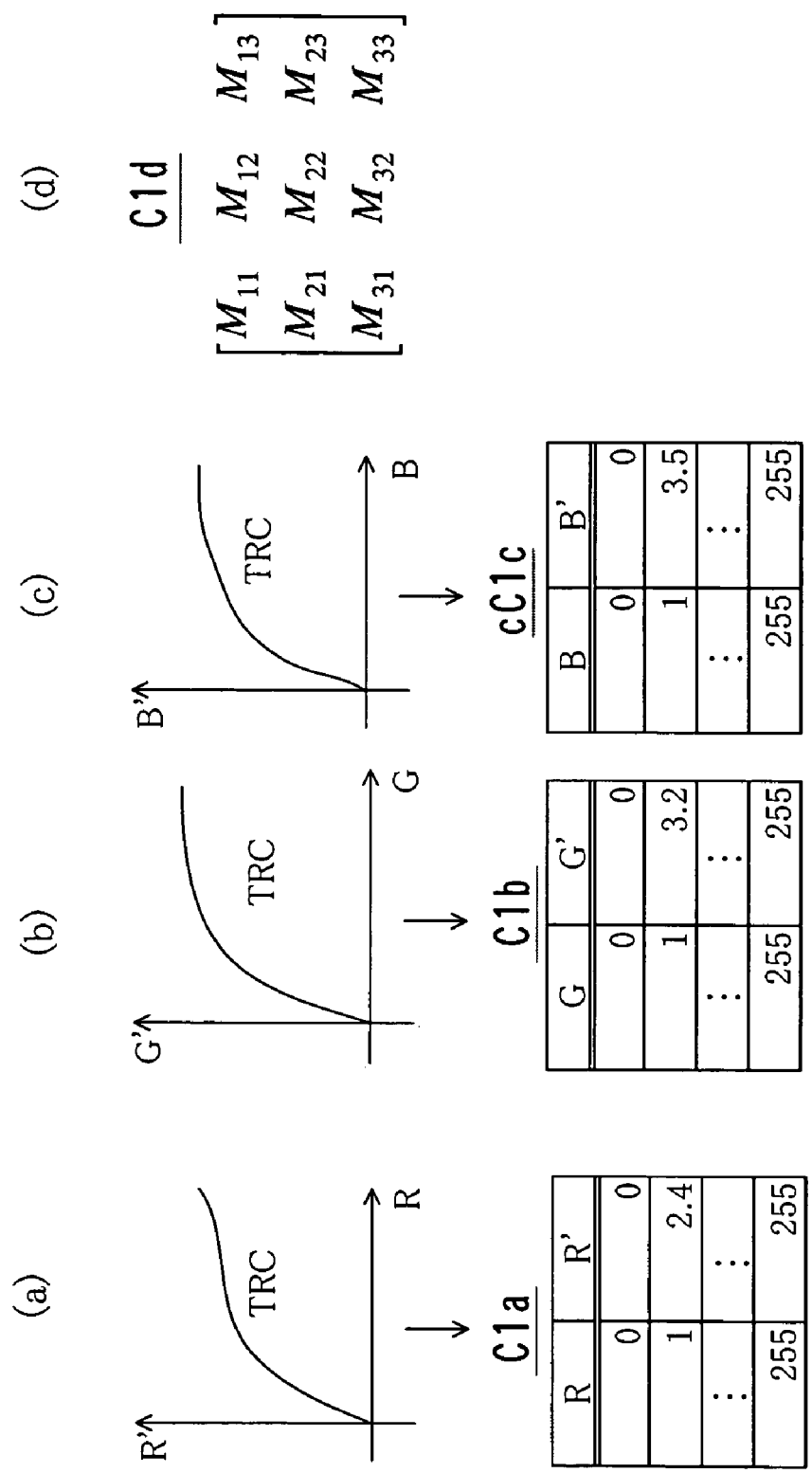
FIG. 8 is a diagram showing an example of conversion data included in a monitor profile.
Figure 10:
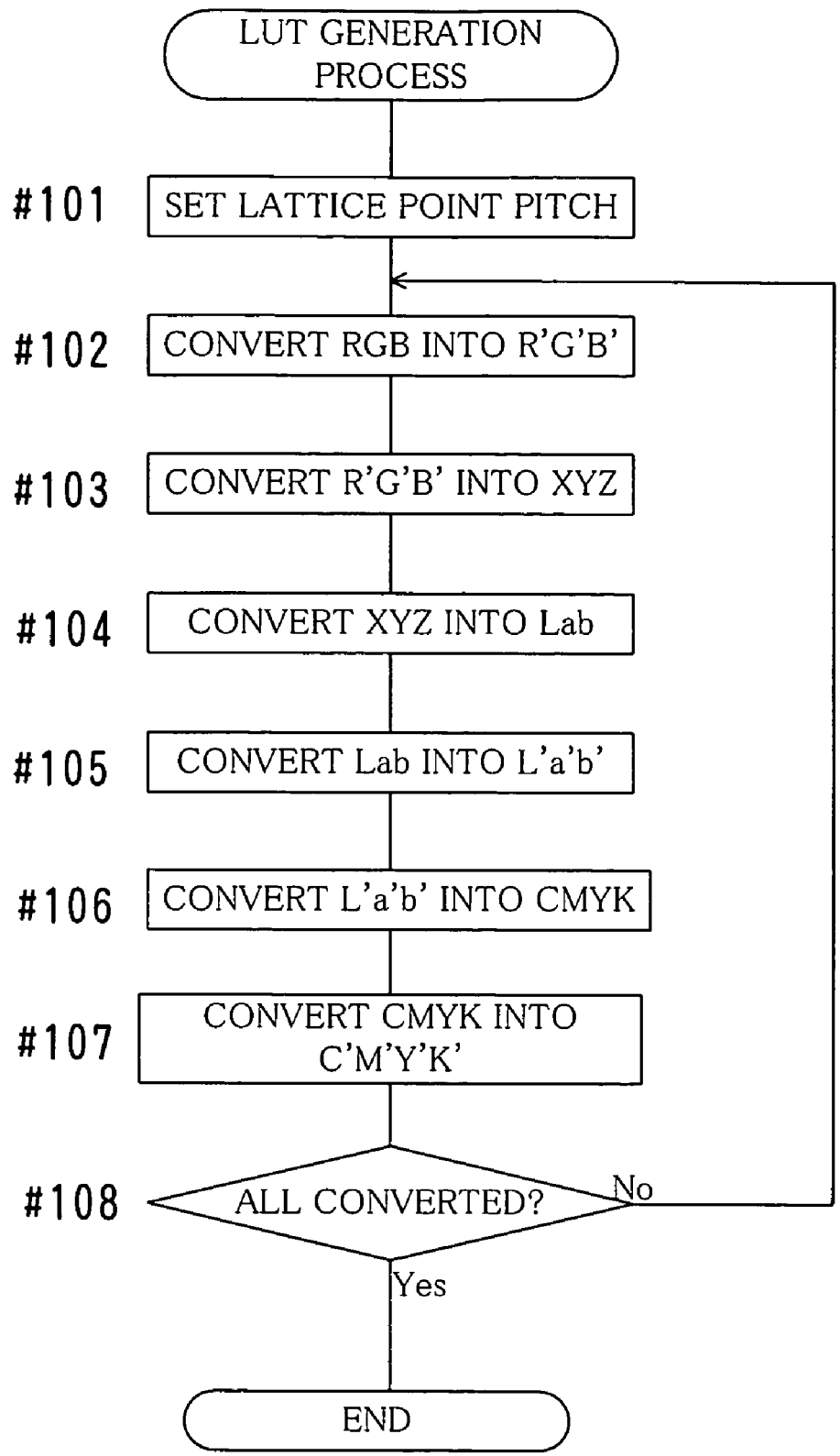
FIG. 10 is a flowchart explaining an example of an LUT generation process in the print mode.

FIG. 6 is a diagram showing an example of a printer driver setting screen HG21, FIG. 7 is a diagram showing an example of a data flow of the multifunction device 1 and others in a print mode, FIG. 8 is a diagram showing an example of conversion data included in a monitor profile P1, FIG. 9 is a diagram showing an example of the conversion data included in a printer profile P4, FIG. 10 is a flowchart explaining an example of an LUT generation process in the print mode, FIG. 11 is a diagram showing an example of an encode corresponding to an ICC profile, and FIG. 12 is a diagram showing an example of a look-up table 7A for a color conversion.

As described above, a user makes a document using application software in his or her terminal device 2. The monitor 3 displays an image showing content of the document.

The user designates the profile on the printer driver setting screen HG21 shown in FIG. 6 as below before printing the image.

In order to designate the monitor profile P1 of the monitor 3 that is connected to the terminal device 2, a pull down menu DL1 is clicked. Then, a list of the monitor profiles P1 that the multifunction device 1 has is displayed, so the user clicks to designate a desired monitor profile P1 among them.

Alternatively, the user clicks a button BN2 indicating "download", so as to download a profile from the terminal device 2 to the multifunction device 1. In this case, a name of the downloaded profile is displayed in the pull down menu DL1 from the next time. When the profile is designated again, it is not necessary to download the profile to the multifunction device 1 again.

In the same way, in order to designate the printer profile P4 for using the multifunction device 1 as a printing apparatus (a printer), a pull down menu DL3 is clicked, and a desired profile in the displayed list is clicked.

The simulation profile P2 is not used in the print mode, so "no" is designated in a pull down menu DL2.

When the user clicks a "OK" button BN3, the terminal device 2 transmits image data GD1 of the document made by the user together with a command 82 indicating execution of print to the multifunction device 1 as shown in FIG. 7. On this occasion, information for distinguishing the designated profile (such as a profile name) is transmitted together with the image data GD1 and others. It is similar in other process modes.

In the multifunction device 1, when the input and output interface 16 receives the image data GD1 and the command 82, the process mode selection portion SY2 selects a process mode in accordance with the command 82. The command 82 indicates execution of print, so the print mode is selected.

Then, the look-up table generation portion SY1 loads the designated monitor profile P1 and printer profile P4 from the profile storage portion SY3 into the memory 12. If the storage portion 13 can be used as a working memory, these profiles may be stored in the profile storage portion SY3.

The monitor profile P1 includes conversion data C1a-C1c that are one-dimensional LUTs for converting (correcting or adjusting) each component of R, G and B values into each value of R', G' and B' as shown in FIGS. 8(a)-8(c), and conversion data C1d that make a 3×3 matrix for converting R, G and B values into X, Y and Z values as shown in FIG. 8(d). Each of the conversion data C1a-C1c is called a TRC (Tone Reproduction Curve).

The printer profile P4 includes three conversion data C4a-C4c that are one-dimensional LUTs for converting each component of Lab color space values (L, a and b values) into each value of L', a', b' as shown in FIGS. 9(a)-9(c), conversion data C4d that make 17×17×17 multidimensional LUT for converting the L, a and b values into CMYK color space value (C, M, Y and K values) as shown in FIG. 9(d), and four conversion data C4e-C4h that are one-dimensional LUTs for converting each component of C, M, Y and K values into each value of C', M', Y', K' as shown in FIGS. 9(e)-9(h). A data length of each component value of the conversion data C4d is 8 bits.

Note that if the print mechanism 15 uses ICC (International Color Consortium) profile as the printer profile, each LUT shown in FIG. 9 for converting the L, a and b values into C, M, Y and K values is written in a predetermined tag (B2A tag). The profiles of other devices are also written in predetermined tags in the same manner.

With reference to FIG. 7 again, the look-up table generation portion SY1 performs the process for generating the LUT for color matching in the procedure as shown in FIG. 10 in accordance with the monitor profile P1 and the printer profile P4. In the print mode, the color image of the document that is displayed on the monitor 3 is printed, so the look-up table generation portion SY1 generates the multidimensional LUT for converting the RGB color space values into CMYK color space values.

In FIG. 10, gradation of each component (channel) of R, G and B is divided by predetermined intervals so as to set lattice points (#101). For example, the lattice points are set so that the number of lattice points becomes 17×17×17 (4913).

Concerning a first lattice point, the R, G and B values ((R, G, B)=(0, 0, 0)) are converted into R', G' and B' values in accordance with the conversion data C1a-C1c (see FIG. 8) included in the monitor profile P1 of the monitor 3 (#102). The R', G' and B' values are converted into X, Y and Z values in accordance with the equation (1) below and the conversion data C1d shown in FIG. 8(d) (#103).

$$\begin{bmatrix} X \\ Y \\ Z \end{bmatrix} = \begin{bmatrix} M_{11} & M_{12} & M_{13} \\ M_{21} & M_{22} & M_{23} \\ M_{31} & M_{32} & M_{33} \end{bmatrix} \begin{bmatrix} R' \\ G' \\ B' \end{bmatrix} \qquad (1)$$

The obtained X, Y and Z values are converted into L, a and b values in accordance with the known formula of a color conversion (#104). Note that the L, a and b values may be encoded corresponding to the ICC profile as shown in FIG. 11(a).

In accordance with the printer profile P4 of the print mechanism 15, the conversion process of Steps #105-#107 is performed. First, components of the L, a and b values that were determined in accordance with the conversion data C4a-C4c (see FIG. 9) in Step #104 are converted into L', a' and b' values (#105).

In accordance with the multidimensional LUT indicated in the conversion data C4d, the L', a' and b' values are converted into C, M, Y and K values by an interpolation operation (#106). As the interpolation operation, a known method such as a cubic interpolation or a triangular pyramid interpolation is used. It is similar for LUT generation processes in other process modes.

Then, in accordance with the conversion data C4e-C4h, components of the C, M, Y and K values are converted into C', M', Y' and K' values (#107).

Concerning the second through 4913th lattice points, the process of Steps #102-#107 is repeated so as to determine the C', M', Y' and K' values corresponding to the R, G and B values. Thus, C', M', Y' and K' values corresponding to R, G and B values of each lattice point are determined so that the objective look-up table 7A is generated as shown in FIG. 12. However, C, M, Y and K in FIG. 12 are C', M', Y' and K' that were determined in Step #107 shown in FIG. 10.

With reference to FIG. 7 again, the generated look-up table 7A is stored in the look-up table memory HW2. It is possible to convert it to a file for storing it in the storage portion 13, too.

The color conversion portion HW1 converts the R, G and B values of each pixel of the image data GD1 obtained from the terminal device 2 into C, M, Y and K values to generate image data GD1' in accordance with the look-up table 7A stored in the look-up table memory HW2. Namely, a color conversion process for the image data GD1 is performed. C, M, Y and K values can be determined by the interpolation operation such as the cubic interpolation or the triangular pyramid interpolation. The interpolation operation is also used for the conversion process based on the look-up table in other process modes in the same way.

The print mechanism 15 prints the image to be printed on a sheet of paper in accordance with the image data GD1' that was generated by the color conversion portion HW1.

Figure 15:
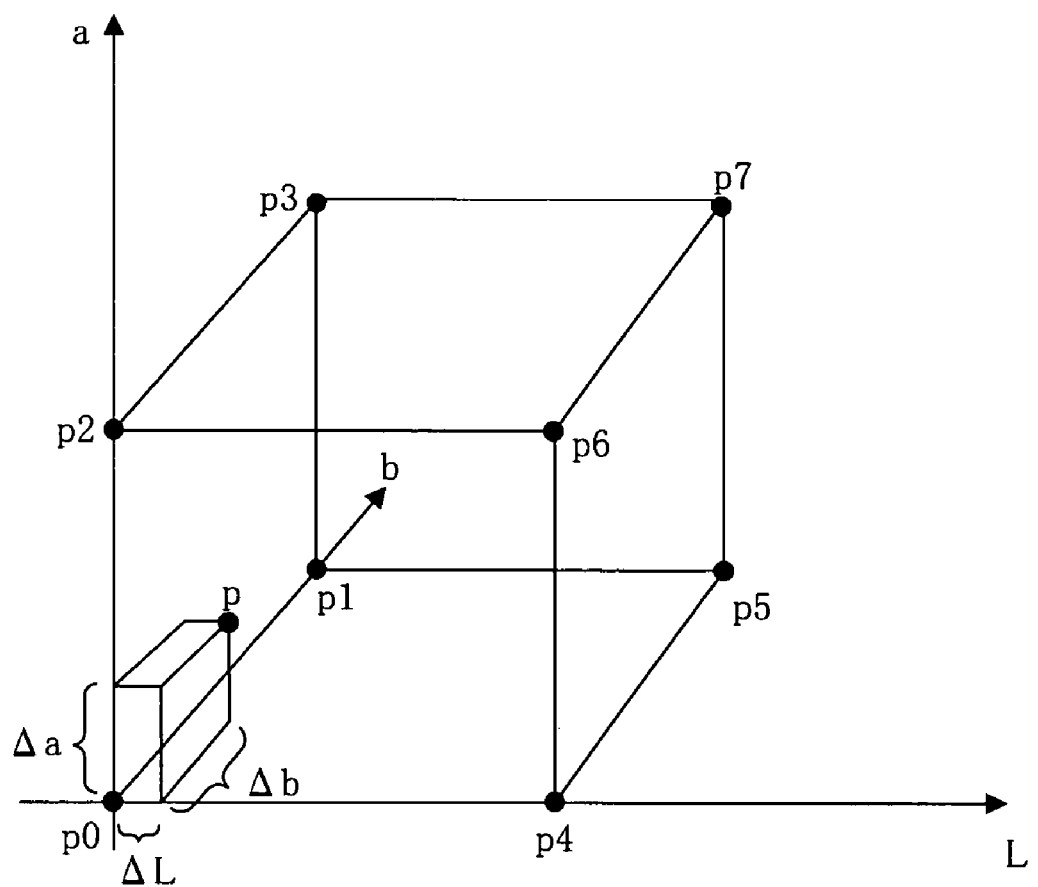
FIG. 15 is a diagram for explaining a method of a cubic interpolation.

FIG. 13 is a diagram showing a variation of the look-up table for a color conversion, FIG. 14 is a diagram showing a variation of the conversion data included in the printer profile P4, FIG. 15 is a diagram for explaining a method of a cubic interpolation, and FIG. 16 is a diagram showing a variation of the conversion data included in the printer profile P4.

Though the look-up table 7A as shown in FIG. 12 is used as the LUT for color matching in the example described above, other format of LUT can be used. For example, three one-dimensional LUTs indicating relationships between R and R', between G and G', and between B and B' as shown in FIGS. 13(a)-13(c), a multidimensional LUT as shown in FIG. 13(d), and four one-dimensional LUTs indicating relationships between C and C', between M and M', between Y and Y', and between K and K' as shown in FIGS. 13(e)-13(h) can be used as a set.

Though the profile (printer profile P4) having the 17×17×17 multidimensional LUT (conversion data C4d) as shown in FIG. 9(d) is used when generating the look-up table 7A in the example described above, it is possible to use a profile having a 33×33×33 multidimensional LUT (conversion data C4d') as shown in FIG. 14. In this case, the multidimensional LUT shown in FIG. 14 is used instead of the multidimensional LUT shown in FIG. 9(d) in Step #106 as shown in FIG. 10.

Also in this case, L, a and b values can be converted into C, M, Y and K values by the interpolation operation in the same manner as the case where the multidimensional LUT shown in FIG. 9(d) is used. For example, according to the method of the cubic interpolation, C, M, Y and K values can be obtained as follows.

The lattice points corresponding to the multidimensional LUT exist in the Lab color space. There are 17×17×17 lattice points in the case of the multidimensional LUT shown in FIG. 9(d), while there are 33×33×33 lattice points in the case of the multidimensional LUT shown in FIG. 14.

The eight lattice points surrounding the L, a and b values to be converted are represented by lattice points p0-p7. As shown in FIG. 15, the point P is located at the position of a vector ($\Delta L$, $\Delta a$ and $\Delta b$) from the lattice point p0 in the cube having vertexes corresponding to the lattice points p0-p7. However, the lattice point p0 is adjacent to the lattice points p1, p2 and p4. Here, C, M, Y and K values of the point p are derived from the following equation (2).

$$f(p)=(1-\Delta L)\times(1-\Delta a)\times(1-\Delta b)\times f(p0)+(1-\Delta L)\times(1-\Delta a)\times(\Delta b)\times f(p1)+(1-\Delta L)\times(\Delta a)\times(1-\Delta b)\times f(p2)+(1-\Delta L)\times(\Delta a)\times(\Delta b)\times f(p3)+(\Delta L)\times(1-\Delta a)\times(1-\Delta b)\times f(p4)+(\Delta L)\times(1-\Delta a)\times(\Delta b)\times f(p5)+(\Delta L)\times(\Delta a)\times(1-\Delta b)\times f(p6)+(\Delta L)\times(\Delta a)\times(\Delta b)\times f(p7) \quad (2)$$

However, f(p) indicates C, M, Y and K values at the point P, and f(p0)-f(p7) respectively denote C, M, Y and K values of the lattice points p0-p7 indicated by the multidimensional LUT.

Alternatively, it is possible to use a profile (printer profile P4) having a multidimensional LUT and a one-dimensional LUT in which C, M, Y and K values have 16 bits as shown in FIG. 16 when generating the look-up table 7A. In this case, the 16 bits of C, M, Y and K values (C', M', Y', K') are obtained in Step #107 as shown in FIG. 10. Therefore, a bit shift process may be performed corresponding to the print mechanism 15 that is an output device of an image. Note that the L, a and b values may be encoded to be adapted to the ICC profile as shown in FIG. 11(b).

In this way, regardless of the pitch of the lattice points of the LUT included in the profile and the bit length of each value, the LUT for the color conversion process can be generated by the same operation method.

[Scan Mode]

Figure 17:
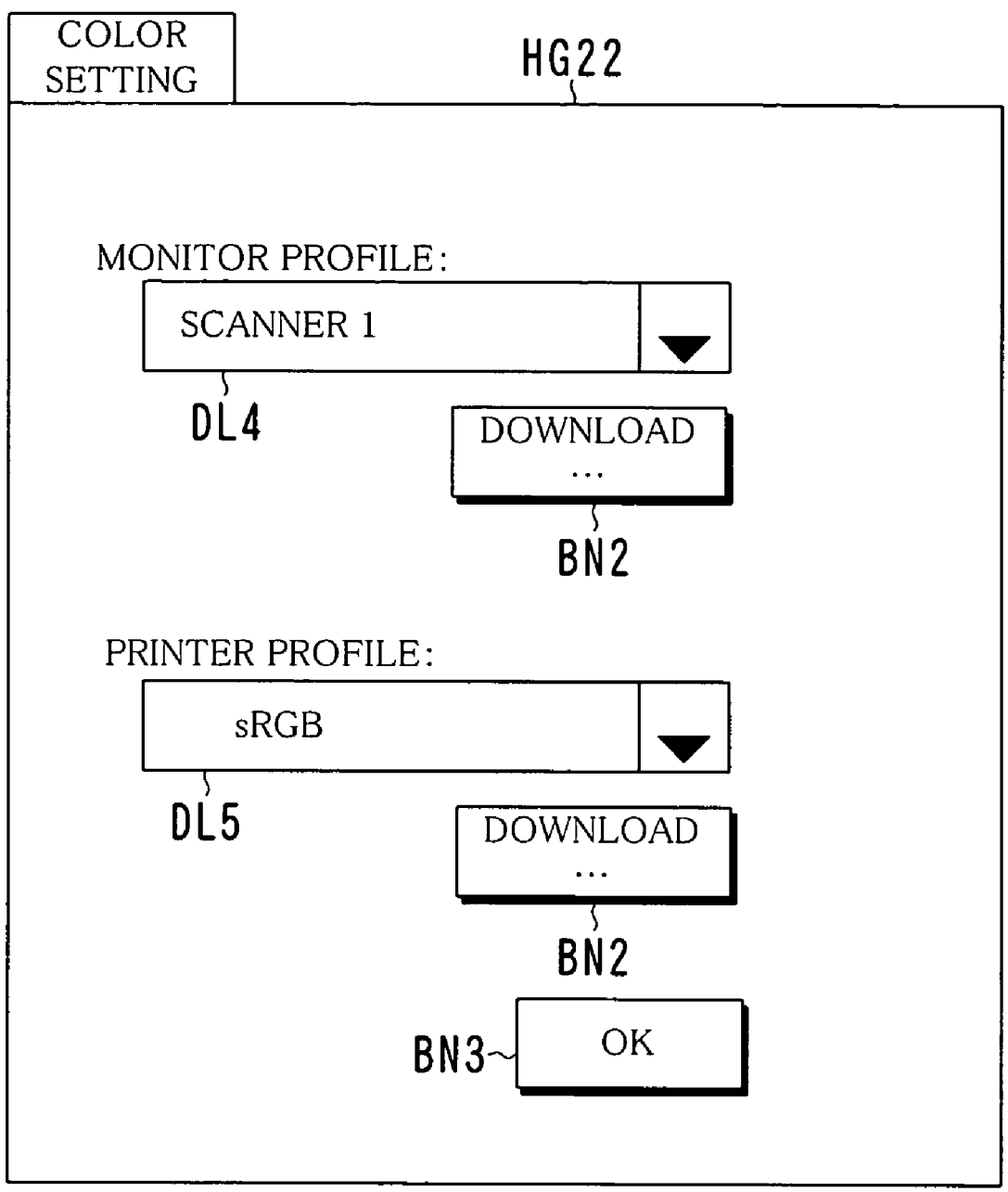
FIG. 17 is a diagram showing an example of a scanner driver setting screen.
Figure 18:
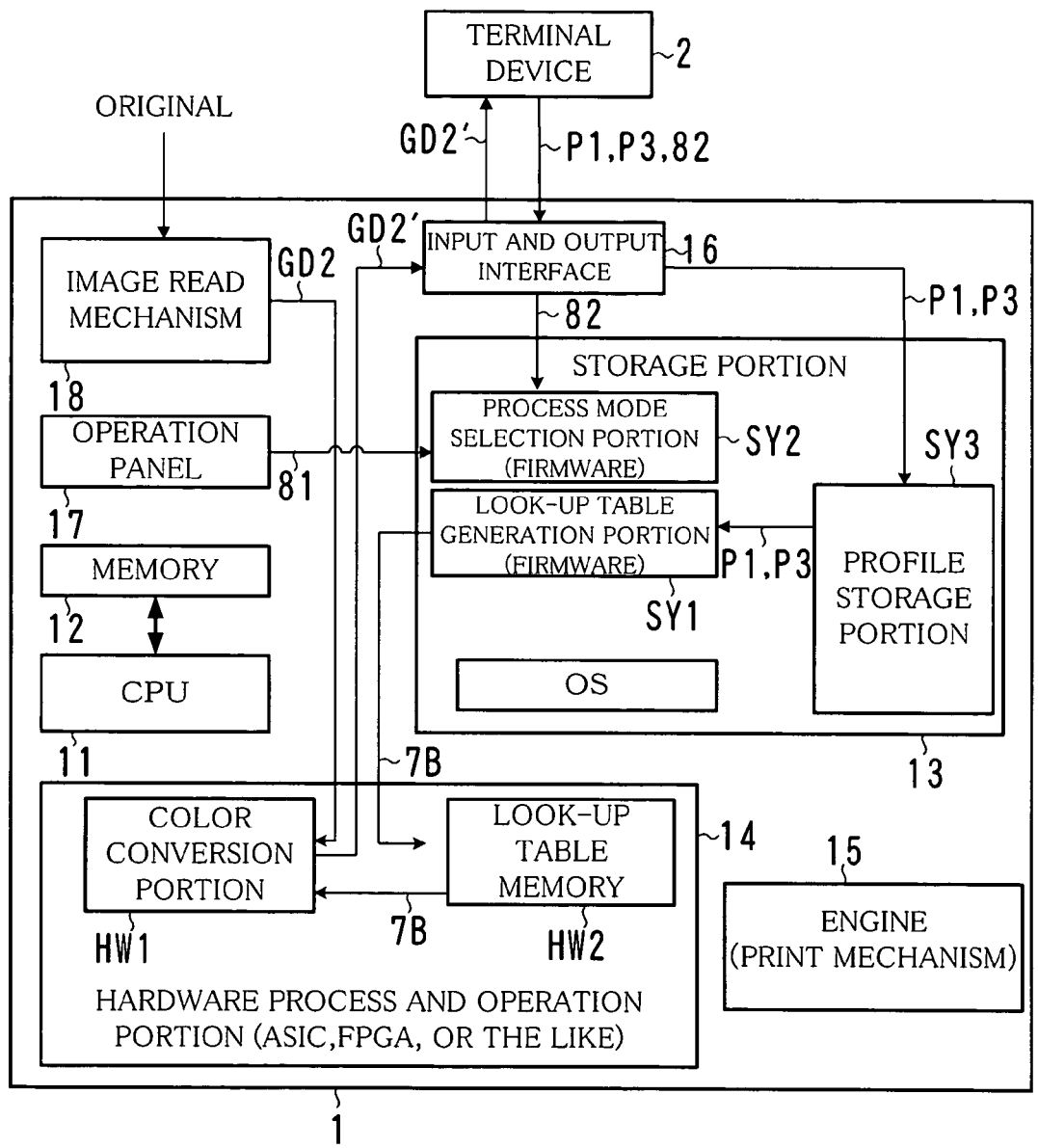
FIG. 18 is a diagram showing an example of a data flow of the multifunction device and others in a scan mode.
Figure 20:
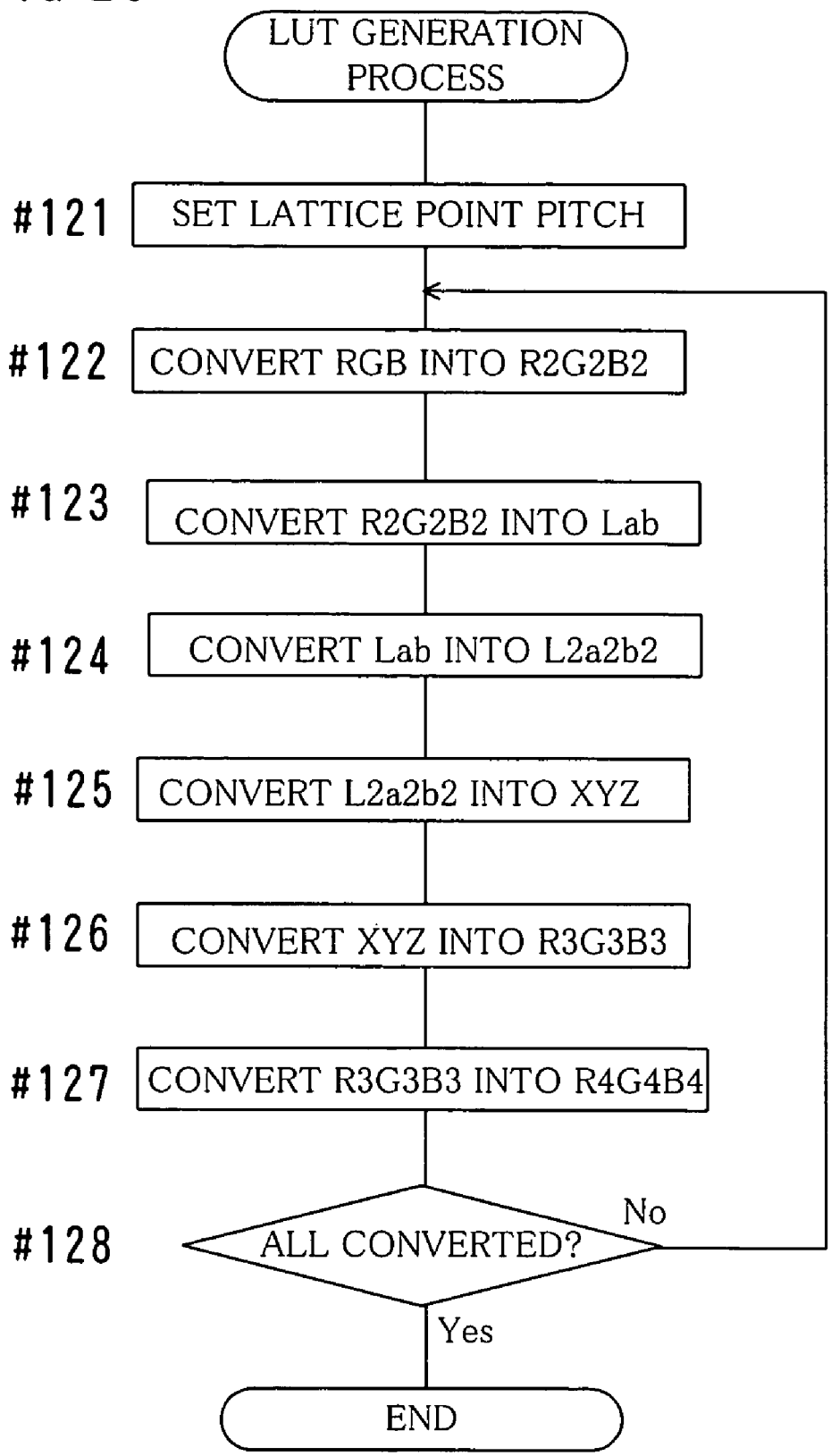
FIG. 20 is a flowchart explaining an example of an LUT generation process in the scan mode.

FIG. 17 is a diagram showing an example of a scanner driver setting screen HG22, FIG. 18 is a diagram showing an example of a data flow of the multifunction device 1 and others in a scan mode, FIG. 19 is a diagram showing an example of conversion data C3d included in a scanner profile P3, FIG. 20 is a flowchart explaining an example of an LUT generation process in the scan mode, and FIG. 21 is a diagram showing an example of a look-up table 7B for a color conversion process.

The user, who wants to process or store a paper original electronically using his or her terminal device 2, can obtain the image data of the original using the multifunction device 1. In this case, the user places the paper original on the original table of the multifunction device 1.

Image retouching software is activated in the terminal device 2, and the TWAIN driver is activated as a scanner driver from the software. The user performs color setting (for example, designation of a profile) on the scanner driver setting screen HG22 if necessary as shown in FIG. 17. An operation on the scanner driver setting screen HG22 is similar to that on the printer driver setting screen HG21 shown in FIG. 6, so the explanation is omitted.

Further, the user may press the "scan" button BN on the process mode selection screen HG1 (see FIG. 5) of the multifunction device 1 after placing the original. On this occasion, the user designates his or her electronic mail address as a transmission destination of the image data.

In the multifunction device 1 shown in FIG. 18, the process mode selection portion SY2 selects the scan mode as a process mode in accordance with the process mode signal 81 from the operation panel 17 or the command 82 from the terminal device 2.

When the scan mode is selected, the look-up table generation portion SY1 calls the scanner profile P3 of the image read mechanism 18 and the monitor profile P1 that was designated by the user from the profile storage portion SY3.

The scanner profile P3 includes conversion data C3a-C3c that make the one-dimensional LUT for converting components of R, G and B values into R', G' and B' values, conversion data C3d that make the multidimensional LUT for converting R, G and B values into L, a and b values as shown in FIG. 19, and conversion data C3e-C3g that make the one-dimensional LUT for converting components of L, a and b values into L', a' and b' values.

A format of the conversion data C3a-C3c is the same as that of the conversion data C1a-C1c shown in FIGS. 8(a)-8(c), and a format of the conversion data C3e-C3g is the same as that of the conversion data C4a-C4c shown in FIGS. 9(a)-(c). However, of course, contents of the conversion data C3a-C3c and C3e-C3g are generated in accordance with characteristics of the image read mechanism 18 and are different from contents of the conversion data C1a-C1c and C4a-C4c.

Note that the format of the scanner profile P3 can be a one-dimensional LUT for an RGB conversion and a 3×3 matrix for an RGB-XYZ conversion.

With reference to FIG. 18 again, the look-up table generation portion SY1 performs the process of generating the LUT for color matching in accordance with the monitor profile P1 and the scanner profile P3 following the procedure as shown in FIG. 20. Here, the look-up table generation portion SY1 generates the multidimensional LUT for converting R, G and B values obtained by a scan process into R, G and B values of a display color adapted to a display by the monitor 3.

In FIG. 20, gradation of each component of RGB is divided by a predetermined interval so as to set lattice points (#121). For example, in the same way as the case of the print mode, each is divided by 16 equally so as to set 17×17×17 lattice points.

Concerning the first lattice point, the R, G and B values ((R, G, B)=(0, 0, 0)) is converted into (R2, G2, B2) in accordance with the conversion data C3a-C3c of the scanner profile P3 (#122). The values (R2, G2, B2) are converted into L, a and b values in accordance with the conversion data C3d (see FIG. 19) (#123). The L, a and b values are converted into L2, a2 and b2 values in accordance with the conversion data C3e-C3g (#124). Furthermore, these values are converted into X, Y and Z values in accordance with the formula of a color conversion (#125).

The X, Y and Z values are converted into R, G and B values in accordance with the equation (3) and the inverse matrix of the conversion data C1d of the monitor profile P1 so as to obtain the values (R3, G3, B3) (#126).

$$\begin{bmatrix} R_3 \\ G_3 \\ B_3 \end{bmatrix} = M \begin{bmatrix} R_2 \\ G_2 \\ B_2 \end{bmatrix} \quad (3)$$

Here, M is an inverse matrix of conversion data C1d.

Furthermore, the values (R3, G3, B3) are converted inversely into (R4, G4, B4) in accordance with the conversion data C1a-C1c so as to be adapted to a display by the monitor 3 (#127).

Then, concerning the second through the 4913th lattice points, the process of Steps #122-#127 is repeated, so as to obtain the R, G and B values of the monitor 3 corresponding to the R, G and B values of each lattice point of the scanner 6. By this operation, the objective look-up table 7B as shown in FIG. 21 is generated. However, the R', G' and B' values in FIG. 21 are respectively R4, G4 and B4 obtained in Step #127 shown in FIG. 20.

"Blank" cells are provided so as to match the number of cells of the look-up table 7A shown in FIG. 12. Thus, a format can be common to that of LUTs that are used in other process modes, and a hardware can be common between the color conversion portion HW1 and the look-up table memory HW2.

With reference to FIG. 18 again, the generated look-up table 7B is stored in the look-up table memory HW2. It is possible to convert the table into a file so as to store it in the storage portion 13, too.

The image read mechanism 18 reads an original image placed on the automatic document feeding device JG (see FIG. 1) in series or in parallel with the generation process of the look-up table 7B so as to generate image data GD2.

The color conversion portion HW1 converts R, G and B values of each pixel of the image data GD2 obtained by the image read mechanism 18 into R', G' and B' values in accordance with the look-up table 7B stored in the look-up table memory HW2 so as to generate image data GD2'. In other words, the color conversion portion HW1 performs a color conversion process of the image data GD2.

The input and output interface 16 transmits the generated image data GD2' to the user's terminal device 2 that made the request for scanning. The original image is displayed on the monitor 3 of the terminal device 2 that received the image data GD2' in a display color adapted to the monitor 3.

[Simulation Mode]

Figure 23:
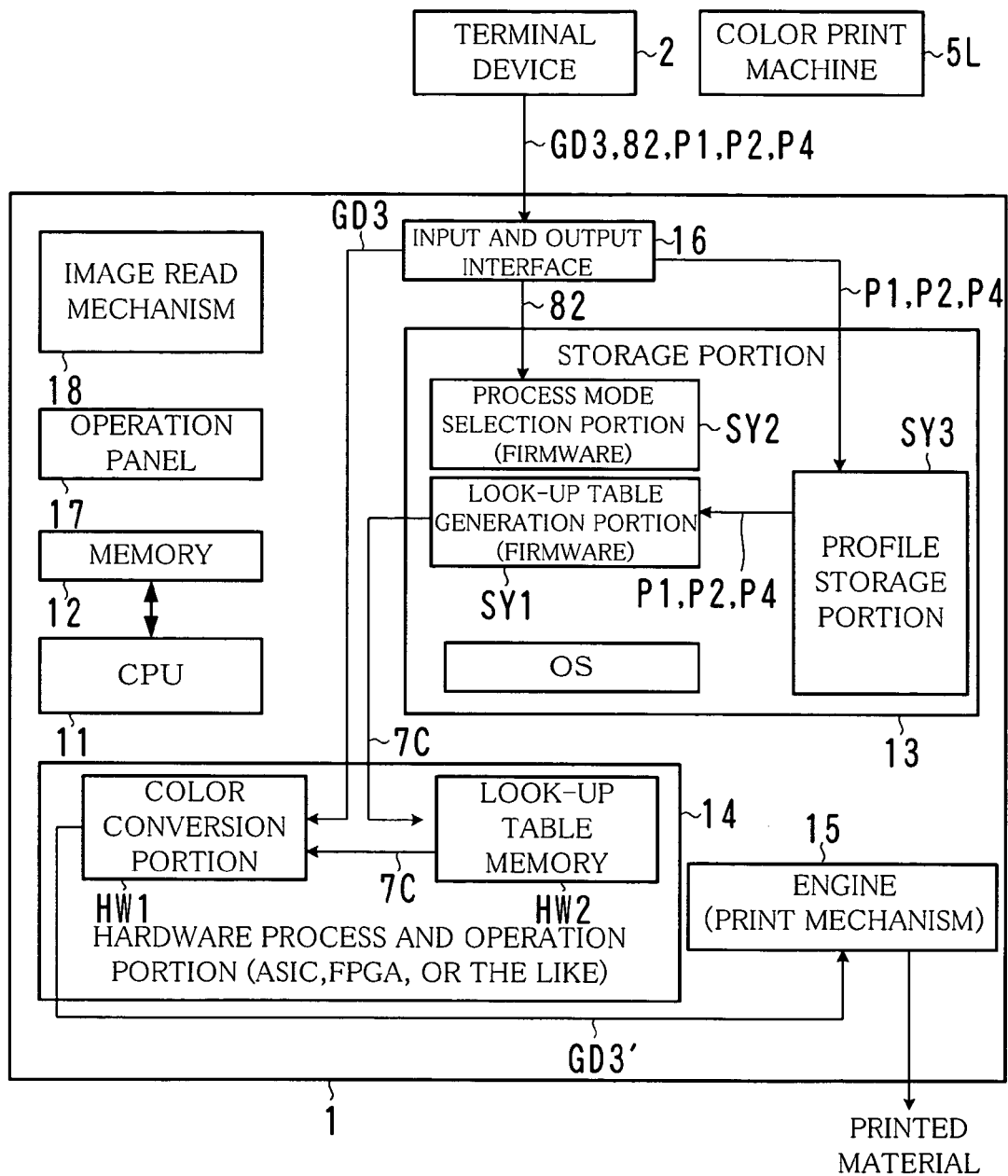
FIG. 23 is a diagram showing an example of a data flow of the multifunction device and others in a simulation mode.
Figure 24:
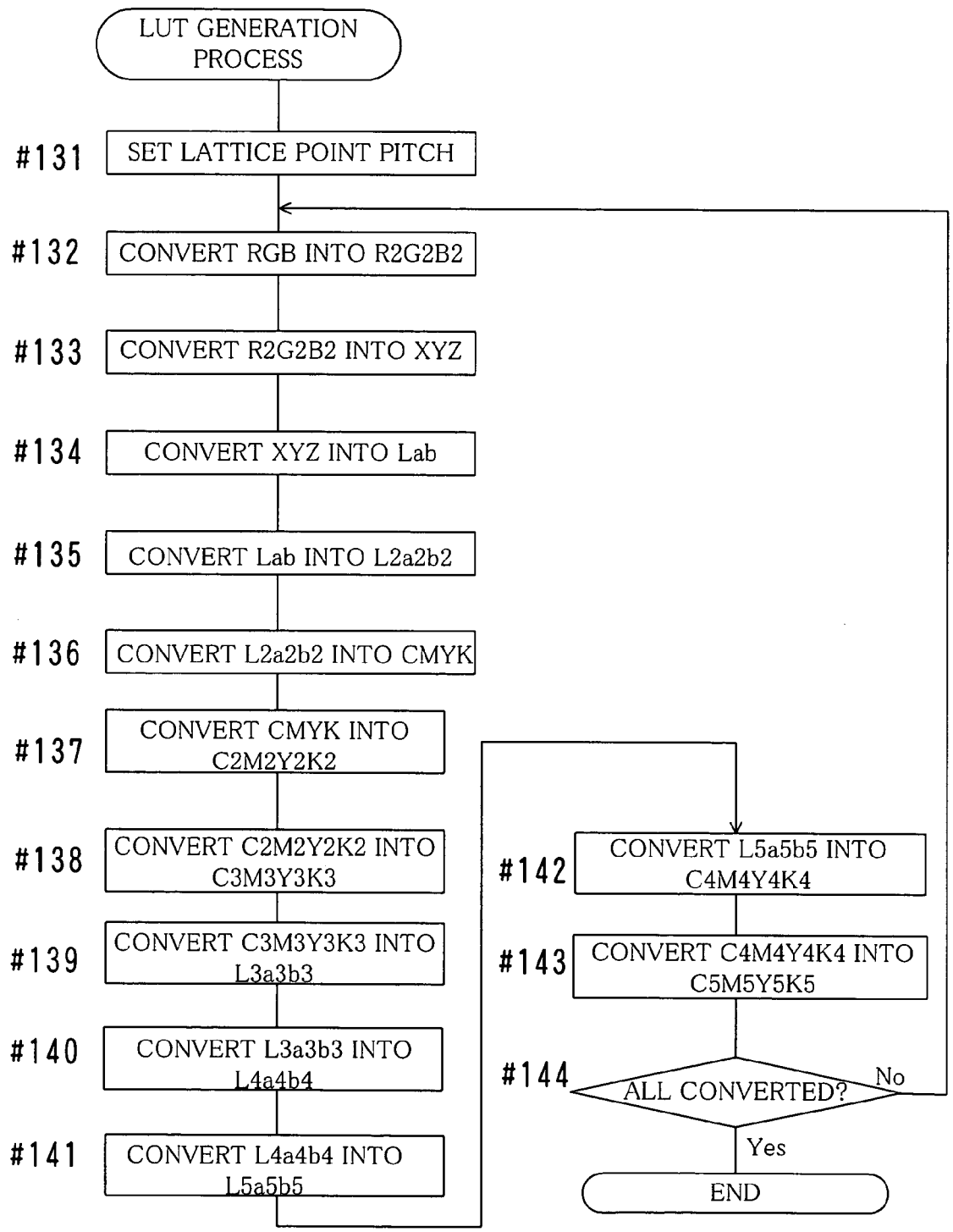
FIG. 24 is a flowchart explaining an example of an LUT generation process in the simulation mode.

FIG. 22 is a diagram showing an example of conversion data C2m included in a simulation profile P2, FIG. 23 is a diagram showing an example of a data flow of the multifunction device 1 and others in a simulation mode, and FIG. 24 is a flowchart explaining an example of an LUT generation process in the simulation mode.

The user can perform test printing (simulation or proof print) by the multifunction device 1 before starting print by another printing apparatus. For example, before starting print by a high performance color print machine 5L (for example, an offset print machine) that can print in a large sheet of paper at high speed for a business use in a printing company, test printing can be performed by the multifunction device 1. Namely, the multifunction device 1 can be used as a proofing machine for the color print machine 5L.

The user makes a document by his or her terminal device 2 in the same way as in the print mode, so as to print the document by the color print machine 5L. An image indicating contents of the document is displayed on the monitor 3.

In addition, the user performs color setting in accordance with the printer driver setting screen HG21 shown in FIG. 6. More specifically, the simulation profile P2 of the color print machine 5L is designated by clicking the pull down menu DL2 or other operation. For example, if the user wants to perform simulation by a standard color of the print industry, a profile such as Japan color (Japan Standard V2) is designated as the simulation profile P2.

The monitor profile P1 and the printer profile P4 are designated in the same manner as in the print mode. Note that if nothing is designated for the simulation profile P2 (namely, if "no" is designated in the pull down menu DL2), the multifunction device 1 assumes that the user selected the print mode and performs the print mode process as described above.

The simulation profile P2 has conversion data C2a-C2h of the format similar to that of the conversion data C4a-C4h shown in FIG. 9. Furthermore, it has conversion data for converting the C, M, Y and K values into L, a and b values (namely, in the direction opposite to the LUT of the B2A tag). More specifically, it has conversion data C2i-C2l that make a one-dimensional LUT for converting components of C, M, Y and K values into C', M', Y' and K' values, conversion data C2m that make a multidimensional LUT for converting C, M, Y and K values into L, a and b values as shown in FIG. 22, and conversion data C2n-C2p that make a one-dimensional LUT for converting components of L, a and b values into L', a' and b' values.

The terminal device 2 transmits image data GD3 of the document to the multifunction device 1 together with identifying information of each profile designated by the printer driver setting screen HG21.

In the multifunction device 1 shown in FIG. 23, when the input and output interface 16 receives the image data GD3, the profile identifying information and others, the process mode selection portion SY2 checks that the simulation profile P2 is designated, and selects the simulation mode.

Then, the look-up table generation portion SY1 performs the process of generating the LUT for color matching for simulation (proof print) of the color print machine 5L in accordance with the profiles P1, P2 and P4 of devices that are received from the terminal device 2 following the procedure as shown in FIG. 24.

In FIG. 24, the lattice points are set first (#131). This process is similar to Step #101 shown in FIG. 10. Concerning the first lattice point, the process in Steps #132-#137 is performed. This process is similar to the process in Steps #102-#107 shown in FIG. 10. However, the conversion process in Steps #135-#137 is performed in accordance with various data of the simulation profile P2, i.e., the data for converting the L, a and b values into C, M, Y and K values (namely, the conversion data C2a-C2h). Note that the L, a and b values may be encoded to be adapted to the ICC profile as shown in FIG. 11(c).

The C, M, Y and K values obtained in Step #137 are converted into L, a and b values (#138-#140). Here, conversion data C2i-C2p are used.

The process in Steps #141-#143 is similar to the process in Steps #105-#107 shown in FIG. 10. However, as a profile for a conversion, the printer profile P4 of the print mechanism 15 is used.

Then, concerning other lattice points, the process in Steps #131-#143 is repeated so as to obtain C, M, Y and K values (C5, M5, Y5 and K5) corresponding to R, G and B values thereof. Thus, an objective look-up table 7C is generated. A format of the look-up table 7C is similar to the format of the look-up table 7A shown in FIG. 12.

With reference to FIG. 23 again, the generated look-up table 7C is stored in the look-up table memory HW2. It may be converted into a file for being stored in the storage portion 13, too.

The color conversion portion HW1 converts the R, G and B values of each pixel of the image data GD3 obtained from the terminal device 2 into C, M, Y and K values in accordance with the look-up table 7C stored in the look-up table memory HW2, so as to generate image data GD3'. Namely, the color conversion portion HW1 performs the color conversion process for the image data GD3.

The print mechanism 15 performs the simulation (proof print) in accordance with the image data GD3' generated by the color conversion portion HW1.

Though three profiles are used for generating the LUT for color matching in the example described above, four or more profiles may be used for generating an LUT and the process same as the process shown in FIG. 24 may be performed in accordance with the number of the profiles.

[Copy Mode]

Figure 25:
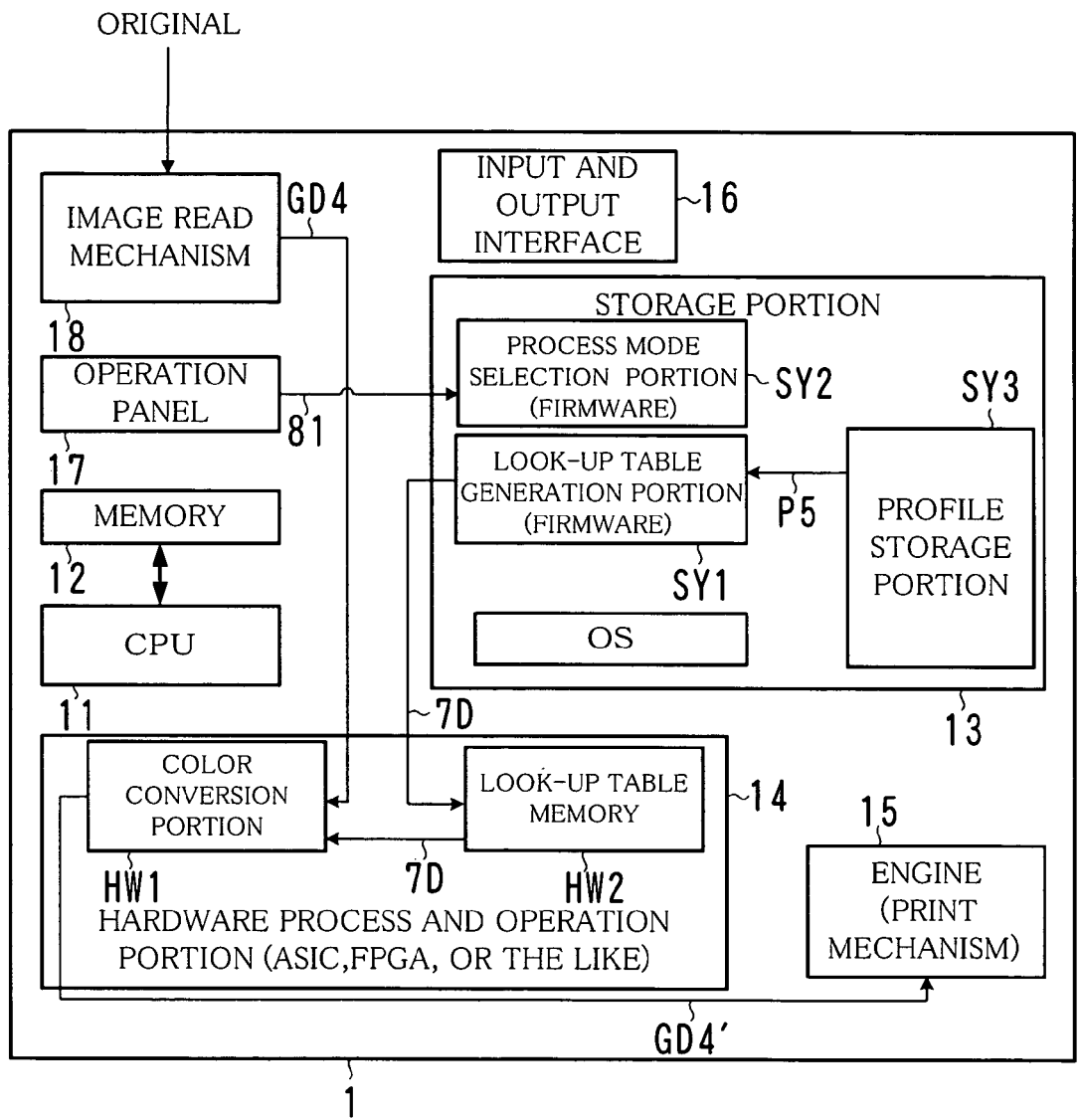
FIG. 25 is a diagram showing an example of a data flow of the multifunction device and others in a copy mode.
Figure 26:
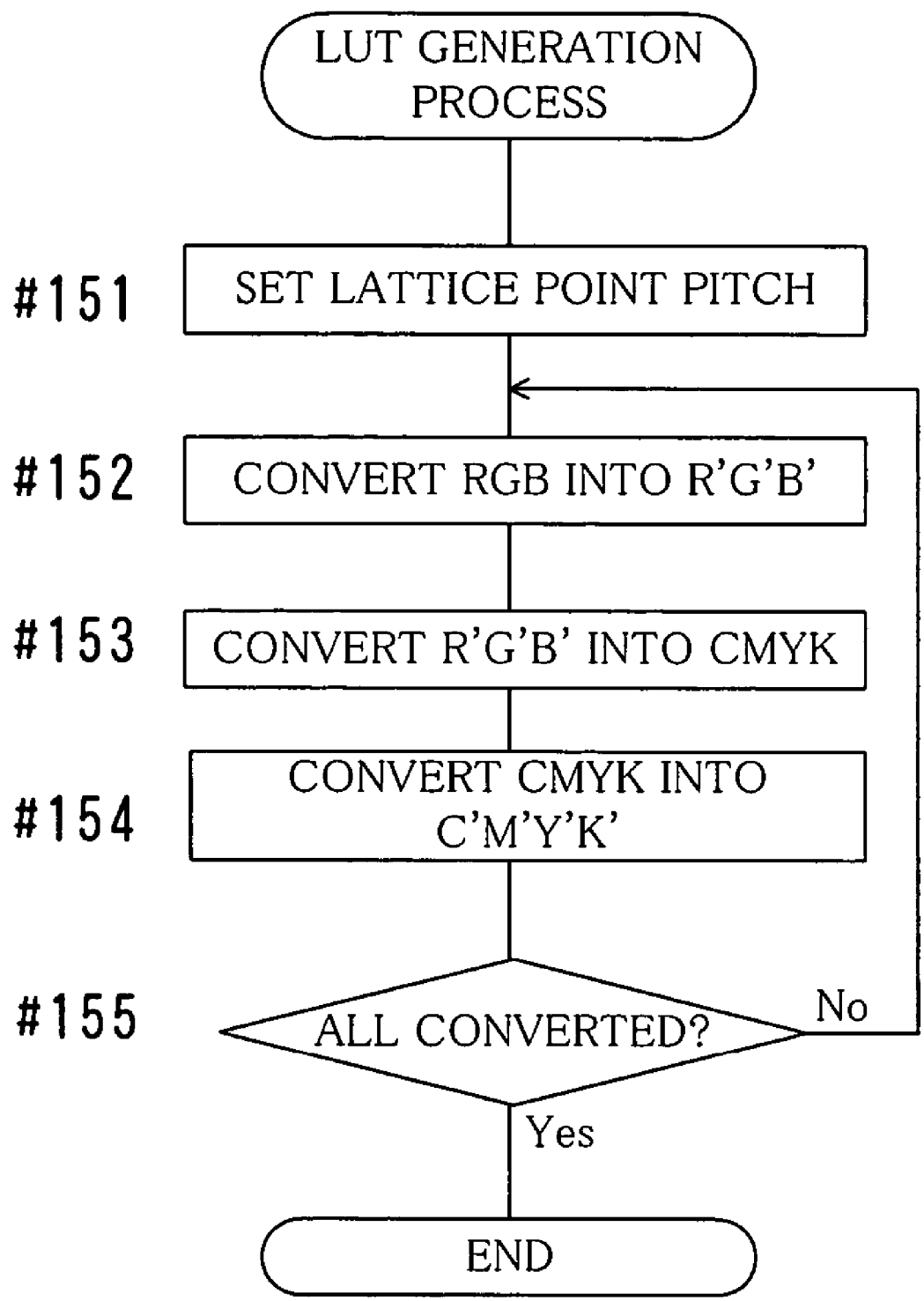
FIG. 26 is a flowchart explaining an example of an LUT generation process in the copy mode.

FIG. 25 is a diagram showing an example of a data flow of the multifunction device 1 and others in a copy mode, and FIG. 26 is a flowchart explaining an example of an LUT generation process in the copy mode.

The user who wants to duplicate (copy) a paper original places the original on the automatic document feeding device JG (see FIG. 1) of the multifunction device 1 and presses the "copy" button BN on the process mode selection screen HG1 (see FIG. 5). On this occasion, an original mode is designated in accordance with a type of the original image. For example, a "character mode" is designated if it is a text original such as a report, while a "picture mode" is designated if it is an original including a lot of pictures.

Then, as shown in FIG. 25, the process mode signal 81 indicating execution of the copy and the original mode designated by the user are transmitted to the process mode selection portion SY2 in the multifunction device 1. The process mode selection portion SY2 selects the copy mode as the process mode.

When the copy mode is selected, the look-up table generation portion SY1 calls the copy profile P5 corresponding to the designated original mode from the profile storage portion SY3. Namely, the copy profile P5 for the character mode is called if the user designated the character mode, while the copy profile P5 for the picture mode is called if the user designated the picture mode.

The copy profile P5 includes conversion data C5a-C5c that make a one-dimensional LUT for converting components of R, G and B values into R', G' and B' values, conversion data C5d that make a multidimensional LUT for converting RGB color space values into CMYK color space values, and conversion data C5e-C5h that make a one-dimensional LUT for converting components of C, M, Y and K values into C', M', Y' and K' values. The copy profile P5 is a device link profile of the multifunction device 1.

The look-up table generation portion SY1 performs the process for generating an LUT for the device link profile using the copy profile P5 following a procedure as shown in FIG. 26.

In FIG. 26, lattice points are set first (#151). This process is similar to that in Step #101 shown in FIG. 10. Concerning the first lattice point, R, G and B values are converted into R', G' and B' values in accordance with the conversion data C5a-C5c (#152), the R', G' and B' values are converted into C, M, Y and K values in accordance with the conversion data C5d (#153), and further the C, M, Y and K values are converted into C', M', Y' and K' values in accordance with the conversion data C5e-C5h (#154).

Then, the process in Steps #152-#154 is performed for other lattice points. Thus, an objective look-up table 7D is generated. This look-up table 7D has a format that is the same as the look-up table 7A shown in FIG. 12.

With reference to FIG. 25 again, the generated look-up table 7D is stored in the look-up table memory HW2. It may be converted into a file and stored in the storage portion 13, too.

The image read mechanism 18 reads the original image placed on the automatic document feeding device JG (see FIG. 1) and generates image data GD4 in series or in parallel with the process of generating the look-up table 7B.

The color conversion portion HW1 converts R, G and B values of each pixel of the image data GD4 obtained by the image read mechanism 18 into C, M, Y and K values in accordance with the look-up table 7D stored in the look-up table memory HW2 so as to generate image data GD4'. Namely, the color conversion portion HW1 performs the color conversion process for the image data GD4.

The print mechanism 15 prints the image to be printed on a sheet of paper in accordance with the image data GD4' generated by the color conversion portion HW1. Thus, a copy of the original is obtained.

Figure 27:
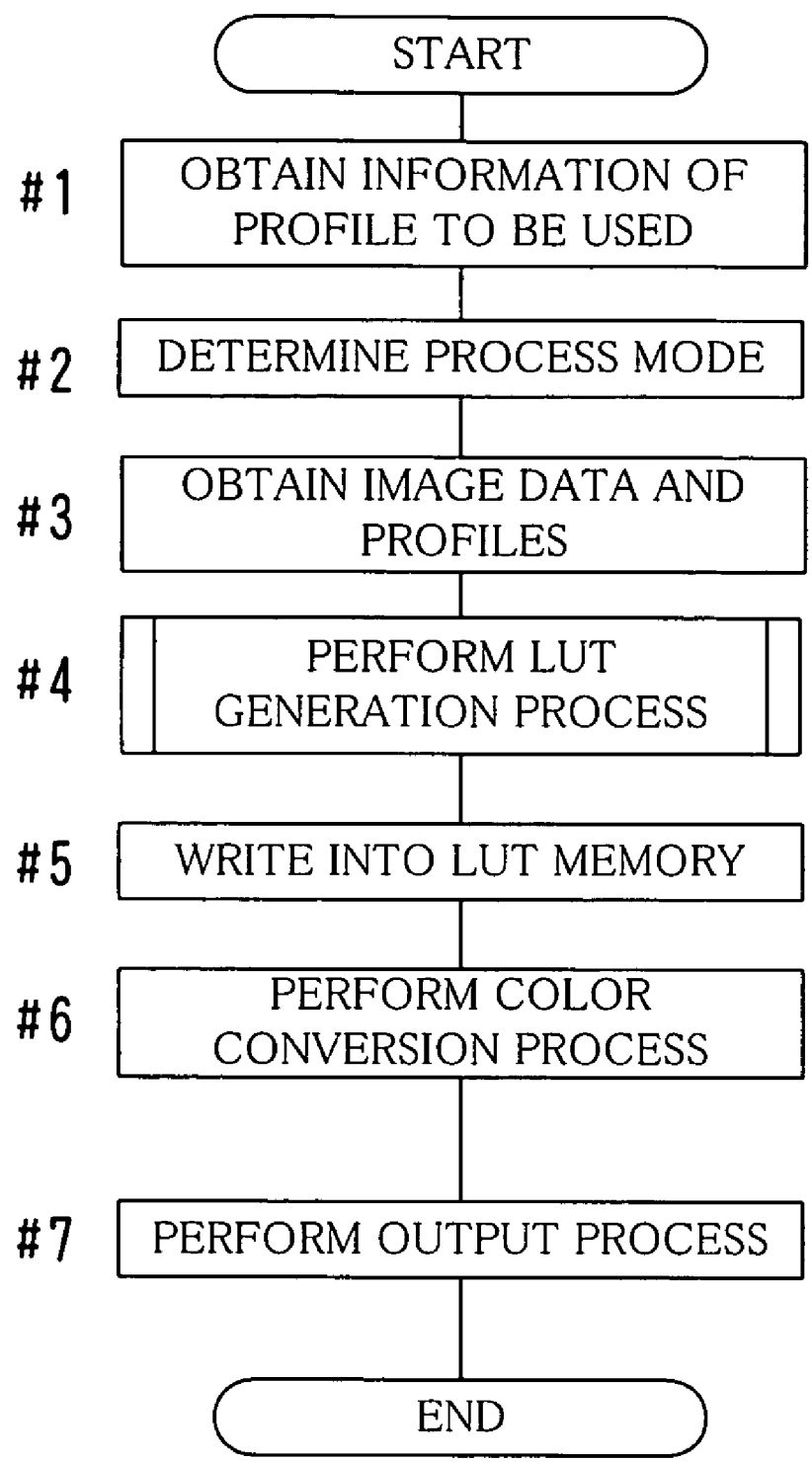
FIG. 27 is a flowchart explaining an example of a general process of the multifunction device.

FIG. 27 is a flowchart explaining an example of a general process of the multifunction device 1. Next, procedural steps of process when the multifunction device 1 performs one of the print, the scan, the simulation and the copy in accordance with the user's want will be described in accordance with the flowchart.

The user operates the multifunction device 1 or the terminal device 2 as described above, so as to prepare for printing out, scanning, simulating (proof printing) or copying, and instructs the multifunction device 1 to execute the process.

Then, in FIG. 27, the multifunction device 1 receives the process mode signal 81 indicating process to be executed or a command 82 (#1) and selects a process mode (#2). The multifunction device 1 obtains image data to be processed and profiles of devices (#3). However, when performing the print or the simulation, the image data are received together with the command 82 in Step #1. Alternatively, it is possible to decide a process mode in accordance with a type of an input interface through which the image data are entered or a driver for performing an input process or the like or designation of the profile or the like. Namely, if the image data are entered by a network I/F and the simulation profile P2 is designated for example, the process mode is decided to be the simulation mode. If the image data are entered by the network I/F but the simulation profile P2 is not designated, the process mode is decided to be the print mode. Alternatively, if the image data are entered by the image read mechanism 18 and the monitor profile P1 is designated, the process mode is decided to be the scanner mode.

In accordance with the process mode selected in Step #2, a process for generating an LUT for a color conversion process (color matching) is performed (#4). Contents of this process are as described above. Namely, the LUT is generated in the procedure shown in FIG. 10 for the print mode, the LUT is generated in the procedure shown in FIG. 20 for the scan mode, the LUT is generated in the procedure shown in FIG. 24 for the simulation mode, and the LUT is generated in the procedure shown in FIG. 26 for the copy mode.

The generated LUT is written and stored in the look-up table memory HW2 (#5). The color conversion process is performed on the image data obtained in Step #3 in accordance with the LUT (#6).

Then, an output process is performed corresponding to the process mode in accordance with the image data that were processed by the color conversion process (#7). Namely, the image is printed in the case of the print mode and the copy mode, the image data processed by the color conversion process are transmitted to the terminal device 2 in the case of the scan mode, and the proof print is performed in the case of the simulation mode.

According to this embodiment, the color conversion process is performed by a hardware so that the color conversion process can be performed at higher speed than the conventional method. Furthermore, a predetermined format of LUT can be generated regardless of the numbers and format types (a pitch of lattice points, a data bit length of each color component value, color space) of profiles that are entered. Therefore, a common hardware for color conversion process can be used even for a multifunctional apparatus like a multifunction device that needs various color conversions.

Figure 28:
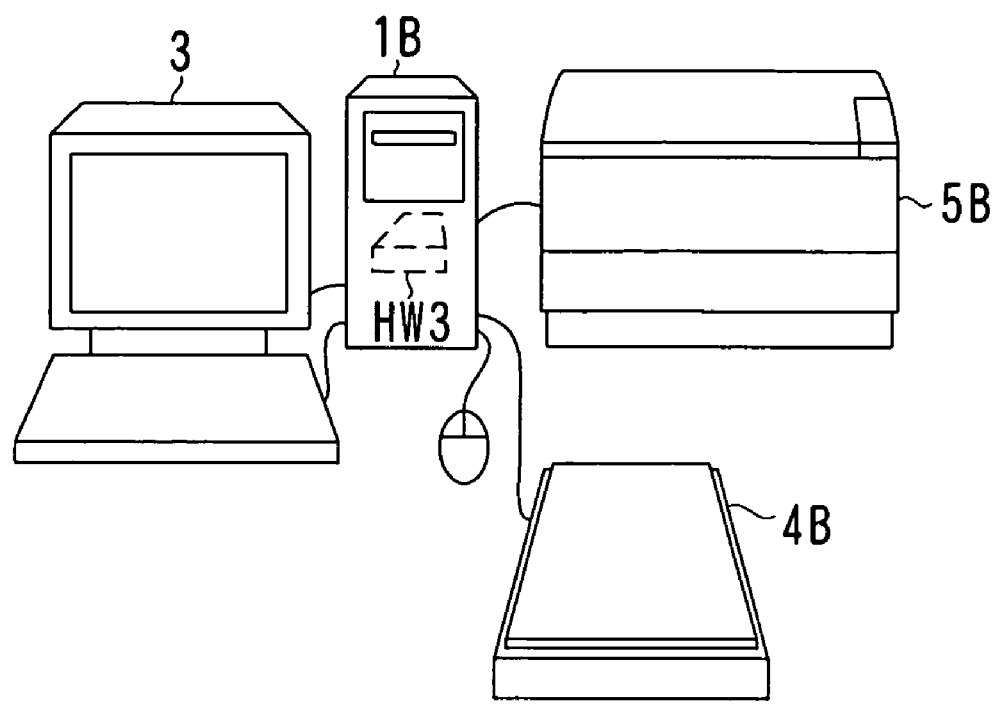
FIG. 28 is a diagram showing an example of a structure in which functions corresponding to a copier, a printer and a scanner of the multifunction device are realized by a personal computer.
Figure 29:
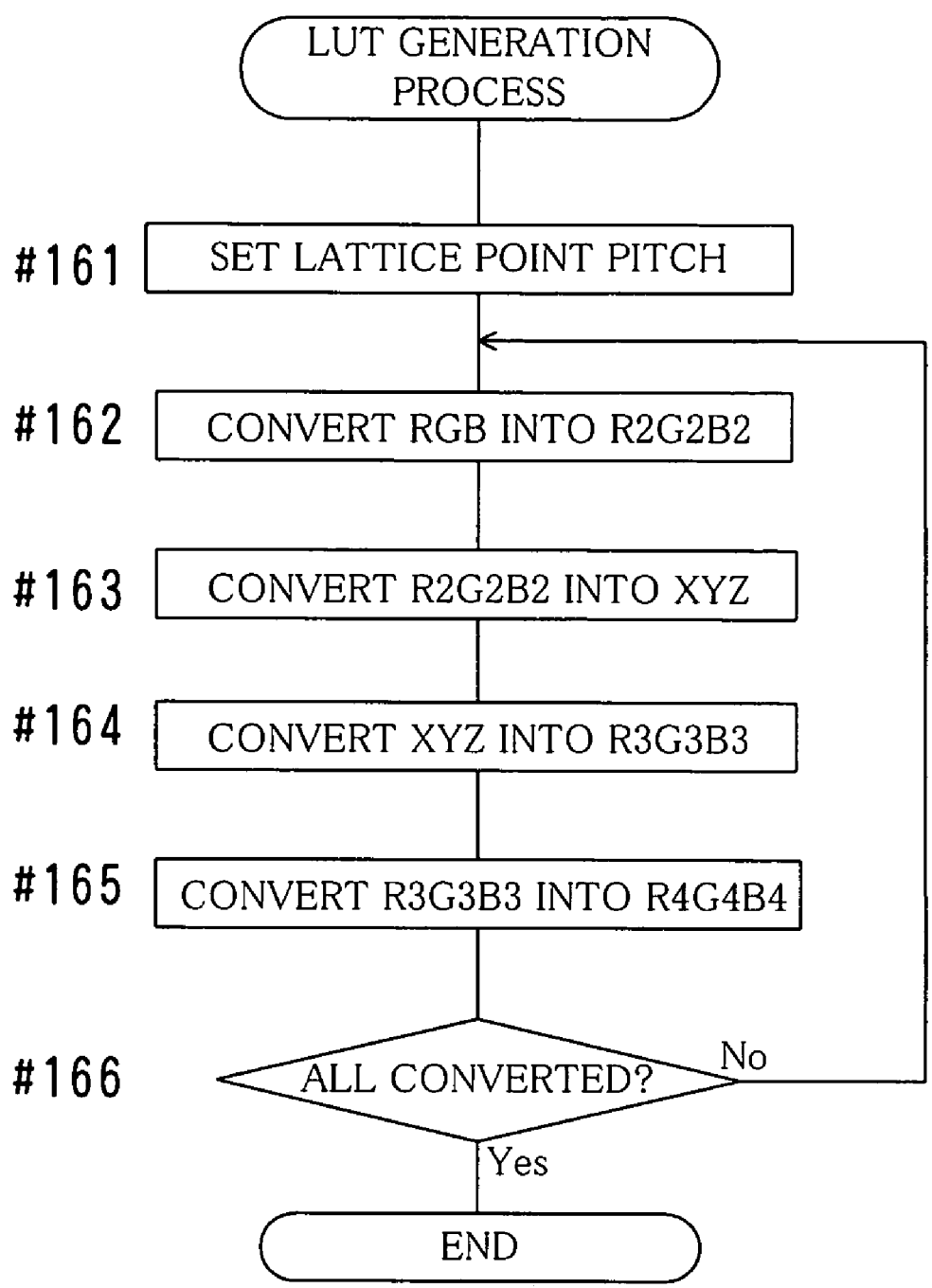
FIG. 29 is a flowchart explaining an example of an LUT generation process when simulating a display of another monitor.

FIG. 28 is a diagram showing an example of a structure in which functions corresponding to a copier, a printer and a scanner of the multifunction device 1 are realized by a personal computer 1B, and FIG. 29 is a flowchart explaining an example of an LUT generation process when simulating a display of another monitor 3'.

Though a multifunction device 1 in which a copier, a printer, a scanner and other functions are integrated is exemplified in this embodiment, the present invention can be applied to a personal computer or a workstation (hereinafter, referred to as a "personal computer 1B" simply). In this case, the personal computer 1B may be structured as follows.

As shown in FIG. 28, a monitor 3, a scanner 4B and a printing apparatus 5B are connected to a personal computer 1B. The programs for the processes described in flowcharts as shown in FIGS. 27, 10, 20, 24 and 26, the monitor profile P1 of the monitor 3, the scanner profile P3 of the scanner 4B and the printer profile P4 of the printing apparatus 5B are installed in a hard disk drive of the personal computer 1B. Alternatively, a hardware unit HW3 for performing a whole or a part of the processes is set in the personal computer 1B.

For example, the hardware unit HW3 including a circuit for performing the color conversion process in Step #6 shown in FIG. 27 and a memory for storing an LUT for the process is set in the personal computer 1B, and software (a program) for generating the LUT is installed in the hard disk drive.

The personal computer 1B generates the LUT in accordance with the monitor profile P1 and the printer profile P4 following the procedure indicated by the flowchart shown in FIG. 10 when a document image made by the user is printed by the printing apparatus 5B. When displaying an image read by the scanner 4B on the monitor 3, the LUT is generated in accordance with the monitor profile P1 and the scanner profile P3 following the procedure indicated by the flowchart shown in FIG. 20.

When printing an image read by the scanner 4B by the printing apparatus 5B (namely, when copying a document), the LUT is generated in accordance with the scanner profile P3 and the printer profile P4 following the procedure indicated by the flowchart shown in FIG. 26. When performing a proof print of another printing apparatus (for example, an offset print machine), the simulation profile P2 is prepared, and the LUT is generated in accordance with the monitor profile P1, the printer profile P4 and the simulation profile P2 following the procedure indicated by the flowchart shown in FIG. 24.

Then, the color conversion process of the image data is performed in accordance with the generated LUT, and an output process (print on a sheet of paper or display on the monitor 3) is performed correspondingly. Note that it is possible to set the hardware unit HW3 in the scanner 4B or the printing apparatus 5B so that the color conversion process is performed by the scanner 4B or the printing apparatus 5B.

It is possible to simulate an image display for another monitor 3' (for example, a large display apparatus for plural viewers) that is not connected to the personal computer 1B, by using the personal computer 1B and the monitor 3. In this case, the process may be performed in the procedure shown in FIG. 29, for example.

In FIG. 29, lattice points are set first (#161). This process is similar to Step #101 shown in FIG. 10. Concerning the first lattice point, components of R, G and B values are converted into R', G' and B' values in accordance with the monitor profile P1 of the monitor 3' (#162), and the R', G' and B' values are further converted into X, Y and Z values (#163).

The X, Y and Z values are converted into R, G and B values in accordance with the monitor profile P1 of the monitor 3 (#164), and the R, G and B values are further adjusted (#165). Then, the process in Steps #162-#165 is performed for other lattice points, too. Thus, the LUT for simulation is generated.

The color conversion process of the image data is performed in accordance with the generated LUT, and the image is displayed on the monitor 3, so that a display state of the monitor 3' can be simulated.

A whole or a part of structure of the multifunction device 1, the personal computer 1B, the terminal device 2, the monitor 3, the scanner 4B and the printing apparatus 5B, contents of the processes, order of the processes, timing of performing the processes, contents of profiles, a screen structure and others can be modified within the scope of the present invention as necessary.

According to the present invention, a color conversion process can be performed at higher speed than the conventional method, so it can be applied particularly suitably to a printing apparatus having a high speed print engine.

Furthermore, according to the present invention, a predetermined format of LUT can be generated from various types of input profiles, so a common hardware for a color conversion can be used. Therefore, the present invention can be applied particularly suitably to a multifunction peripheral (MFP) having a print mode, a copy mode and a scan mode.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A multifunction device comprising:
    an image read device for obtaining image data of a color image by reading an original of the color image;
    a printing apparatus for printing the color image on a sheet of paper;
    a communication portion for transmitting image data to or receiving image data from a computer having a monitor;
    a process mode selection portion for selecting one of a print mode, a copy mode and a scan mode;
    a look-up table generation portion for generating a look-up table;
    a storage device for storing the generated look-up table; and
    a color conversion circuit for performing a color conversion process on the image data in accordance with the look-up table stored in the storage device, wherein
    if the print mode is selected,
    the look-up table generation portion generates a look-up table for linking values that indicate display colors of the monitor to values that indicate print colors of the printing apparatus corresponding to the display colors in accordance with a profile of the printing apparatus and a profile of the monitor,
    the color conversion circuit performs the color conversion process on the image data received from the computer, and
    the printing apparatus prints a color image in accordance with the image data on which the color conversion circuit performed the conversion process, and
    if the copy mode is selected,
    the look-up table generation portion generates a look-up table for linking values that indicate read colors of the image read device to values that indicate print colors of the printing apparatus corresponding to the read colors in accordance with a device link profile of the multifunction device,
    the color conversion circuit performs the color conversion process on the image data obtained by the image read device, and
    the printing apparatus prints a color image in accordance with the image data on which the color conversion circuit performed the color conversion process, and
    if the scan mode is selected,
    the look-up table generation portion generates a look-up table for linking values that indicate read colors of the image read device to values that indicate display colors of the monitor corresponding to the read colors in accordance with a profile of the image read device and a profile of the monitor,
    the color conversion circuit performs the color conversion process on the image data obtained by the image read device, and
    the communication portion transmits the image data on which the color conversion circuit performed the conversion process to the computer.

2. The multifunction device according to claim 1, wherein the process mode selection portion selects one of the print mode, the copy mode, the scan mode and a simulation mode, and
    if the simulation mode is selected
    the look-up table generation portion generates a look-up table for linking values that indicate display colors of the monitor to values that indicate print colors of the printing apparatus corresponding to the print colors in accordance with a profile of the printing apparatus, a profile of the monitor and a profile of another printing apparatus,
    the color conversion circuit performs the color conversion process on the image data received from the computer, and
    the printing apparatus prints a color image by simulating the other printing apparatus in accordance with the image data on which the color conversion circuit performed the color conversion process.

3. The multifunction device according to claim 1, wherein the look-up table generation portion generates a predetermined format of the look-up table by performing bit adjustment of data included in the profile of each device as necessary.

4. A computer comprising:
    a communication portion for performing communication with an image read device for reading an original of a color image or with a printing apparatus for printing a color image on a sheet of paper;
    a process mode selection portion for selecting one of a print mode and a scan mode;
    a look-up table generation portion for generating a look-up table;
    a storage device for storing the generated look-up table; and
    a color conversion circuit for performing a color conversion process on image data in accordance with the look-up table stored in the storage device, wherein
    if the print mode is selected,
    the look-up table generation portion generates a look-up table for linking values that indicate display colors of a monitor to values that indicate print colors of the printing apparatus corresponding to the display colors in accordance with a profile of the printing apparatus and a profile of the monitor,
    the color conversion circuit performs the color conversion process on image data of an image to be printed, and
    the communication portion transmits the image data on which the color conversion circuit performed the color conversion process together with an instruction to print the color image in accordance with the image data to the printing apparatus, and
    if the scan mode is selected,
    the look-up table generation portion generates a look-up table for linking values that indicate read colors of the image read device to values that indicate display colors of the monitor corresponding to the read colors in accordance with a profile of the image read device and a profile of the monitor,
    the communication portion receives the image data of the color image read by the image read device from the image read device, and
    the color conversion circuit performs the color conversion process on the image data received from the image read device.

* * * * *